350-3.66 SR

XR 3,573,362

SEARCH ROOM

[11] 3,573,362

[72] Inventor Christoph B. Burchardt
Berkeley Heights, N.J.

[21] Appl. No. 712,725
[22] Filed Mar. 13, 1968
[45] Patented Apr. 6, 1971
[73] Assignee Bell Telephone Laboratories, Incorporated
Murray Hill, Berkeley Heights, N.J.

[54] AN ON-AXIS REFERENCE BEAM METHOD FOR FORMING CARRIER FREQUENCY HOLOGRAMS
27 Claims, 16 Drawing Figs.

[52] U.S. Cl. .......... 178/6.7, 340/173, 350/3.5
[51] Int. Cl. .......... H04n 5/84, G11c 13/04
[50] Field of Search .......... 178/6.7; 340/173 (LM); 350/3.5

[56] References Cited
UNITED STATES PATENTS
3,444,316 5/1969 Gerritsen .......... 178/6.5

*Primary Examiner*—J. Russell Goudeau
*Attorneys*—R. J. Guenther and Arthur J. Torsiglieri

ABSTRACT: In one embodiment of this invention, a reference beam and an information-bearing beam are combined into a collinear beam and then directed through a mask onto a recording medium. In one direction this mask has a periodic variation in intensity transmissivity. After the first exposure, the mask is shifted a distance equal to one-third the spatial period of its transmissivity variation; and a one-third waveplate is inserted in the path of either the reference beam or the information beam to effect a 120° phase shift therein. A second exposure is then made. In similar fashion a third exposure is made with a similar mask shift and an additional 120° phase shift.

Other embodiments, producing effects similar to those formed by masking but with the added advantage of bandwidth reduction, are also disclosed.

3573362
NO OR CLASSIF

INVENTOR
C. B. BURCKHARDT
BY
R B Anderson
ATTORNEY

AN ON-AXIS REFERENCE BEAM METHOD FOR FORMING CARRIER FREQUENCY HOLOGRAMS

BACKGROUND OF THE INVENTION

When an object is illuminated, it modulates the illuminating beam so as to form a beam of light that carries information representative of the object. A record, called a hologram, can be made of the phase and amplitude of this information-bearing beam by interfering on a recording medium, such as a photographic plate, the wavefronts of the information beam and a reference beam. Proper illumination of the hologram reconstructs therefrom the stored information-bearing beam and therefore an image of the stored object.

In a Gabor hologram, the information and the reference beams incident on the recording medium are collinear, that is, the two beams propagate along the same straight path. When a hologram so formed is illuminated, the stored information beam that is projected from the hologram, and its conjugate, are collinear with the illuminating beam that transits the hologram. As a result of this and other problems, it is very difficult to detect the image of the object stored in the hologram. One solution to these problems is given by E. N. Leith and J. Upatnieks in "Reconstructed Wavefronts and Communication Theory," Journal Optical Society of America, 52, pp. 1123—1130 (1962). They have shown that if there is sufficiently large angle between the information beam and the reference beam during formation of the hologram, then upon reconstruction three beams are projected from the hologram, one of which is the undiffracted portion of the illuminating beam while the two diffracted beams are the stored information-bearing beam and its conjugate. One of the diffracted beams projected from the hologram forms a virtual image of the object stored in the hologram; the other forms a real image. Either image can be viewed without obscuration by the other image or by the undiffracted portion of the illuminating beam.

The Leith and Upatnieks hologram has found wide acceptance in the art. However, it is sometimes impractical to form a hologram with information and reference beams that are projected onto the recording medium at different angles. For example, if there is a phase-distorting medium between the information to be stored and the recording medium, then it is best to use collinear information and reference beams to form the hologram because the two beams will be affected by the distortion in almost the same way. In contrast, if the beams are not collinear, the distortions suffered by the two beams may be substantially different, and this will affect the quality of the reconstruction from the hologram.

Similarly, collinear beams are preferable when short-coherence-length light sources, such as the mercury arc lamp, are used because collinearity minimizes the optical path length difference between the rays of the reference beam and the rays of the information beam. If, for example, one beam is incident on the recording medium at an angle to the other as in the Leith and Upatnieks hologram, then the optical path length of the rays on one side of the angled beam differs from that of the rays on the other side. And if this variation in path length is great enough, then the path length differences between at least some of the rays of the reference beam and the rays of the information beam are longer than the short coherence length of the source. However, at least in the case where relatively simple information sources such as two-dimensional transparencies are used to put information onto the information beam by modulating the intensity of the beam without changing its path length appreciably, the use of collinear beams result in path length differences that can be smaller than the short coherence length of the light source. Consequently, good quality holograms can be made.

The Leith and Upatnieks hologram can also be an inefficient way to record information because of the high-resolution and high-transmission capacity it requires of any hologram transmission system, such as a television system, in which it is used. As explained by K. S. Pennington in "How to Make Laser Holograms," Microwaves, p. 35 (Oct. 1965), when an information beam and a reference beam are incident on a recording medium at different angles, as in the formation of a Leith and Upatnieks hologram, they produce an interference pattern consisting of an array of parallel light and dark fringes, the number of fringes per unit distance being directly proportional to the angle between the two beams. Because there is a minimum angle between the beams during formation, below which it is impossible to separate the three beams projected from the hologram when it is illuminated, there is also a minimum number of fringes per unit distance on the hologram. This minimum number of fringes determines to a great extent both the spatial frequency bandwidth of the hologram, which is a measure of the resolution required of the medium on which the hologram is recorded, and the temporal frequency bandwidth, which is a measure of the transmission capacity required of any system that is used to transmit the hologram. As is well known, the lower the number of fringes per unit distance on the hologram, the smaller are the spatial and the temporal frequency bandwidths of the hologram; and as a result, the lower is the required resolution of the recording medium, and the greater is the number of messages, or holograms, that can be transmitted over any channel. The spatial and the temporal frequency bandwidths of a Leith and Upatnieks hologram, however, are relatively large.

SUMMARY OF THE INVENTION

Accordingly it is an object of my invention to form with collinear information and reference beams a hologram that will reconstruct an information beam that is not obscured by the illuminating beam that transits the hologram.

It is a further object to form a hologram that is less susceptible to the vagaries of the medium between the hologram and the light sources that illuminate it.

It is still a further object to form a hologram that is less sensitive to coherence length requirements in the light sources that are used to form the hologram.

These and other objects of my invention are achieved in one illustrative embodiment thereof by combining the reference beam and the information-bearing beam into a collinear beam and directing this beam through a mask onto a recording medium. In one direction this mask has a periodic variation in intensity transmissivity. After the first exposure of the recording medium, the mask is shifted a distance equal to one-third the spatial period of its transmissivity variation; and a phase change is made in either or both the information beam or the reference beam so that the phase difference between the two beams is 120° removed from the phase difference during the first exposure. A second exposure is then made by illuminating the recording medium. In similar fashion, a third exposure is made in which the mask is shifted another one-third of its period and an additional 120° phase shift is made so that the phase difference between the two beams in the third exposure is 240° removed from the phase difference during the first exposure. As a result there are formed on the recording medium three sets of interference fringes. These sets constitute a hologram.

If one side of the hologram is then illuminated by an appropriate beam, at least three beams of light emanate from its other side. These beams are equivalent to those emanating from an illuminated Leith and Upatnieks hologram. One of these beams is that portion of the illuminating beam that has transited the hologram without diffraction; and, of course, it is projected in the same direction as the illuminating beam. The other two beams, however, are diffracted and diverge from the axis of the illuminating beam. One of these off-axis beams is the information-bearing beam stored during the three exposures detailed above, and the other is its conjugate. One of the beams reconstructs a virtual image of the information it carries; and the other a real image in the same way that the off-axis beams from an illuminated Leith and Upatnieks hologram reconstruct virtual and real images. Thus, even though the hologram was made with collinear information and reference beams, the reconstructed images can be viewed without obscuration either by each other or by the undiffracted portion of the illuminating beam.

It is an additional object of alternative embodiments of my invention to make more practical hologram transmission by electronic means. In the typical hologram transmission system, a Leith and Upatnieks hologram is formed on the target of a photoelectric converter such as a camera tube. The camera tube forms an electromagnetic signal representative of the hologram and this signal is transmitted to the point where the information in the hologram is to be reconstructed. There the electromagnetic signal is converted back to a hologram by display means such as a cathode ray tube, and a record is made of this second hologram.

It will be seen that the alternative embodiments of my invention reduce the spatial resolution required of the photoelectric converter by a factor of four and the spatial resolution required of the display means by a factor of two, compared to that required in transmitting a Leith and Upatnieks hologram of the same information-bearing beam. Furthermore, the time-bandwidth product needed to transmit the hologram is reduced by a factor of up to two, again compared to a Leith and Upatnieks hologram.

All this is accomplished in an illustrative embodiment by using collinear beams with the phase-shifting techniques detailed above but without masking to form three different sets of interference fringes that are converted into three electromagnetic signals by a device such as a camera tube. To produce an effect similar to that produced by the mask in the first embodiment, each of the three signals is then multiplied by a bipolar sinusoidal wave, the phase of the sinusoidal waves differing by 120° in each multiplication. Finally, the three resultant electromagnetic signals are used to form on a recording medium a second hologram suitable for viewing.

In one of these embodiments each of the three resultant electromagnetic signals is successively scanned across a cathode ray tube and recorded on a recording medium. With proper synchronization of the apparatus, each signal is scanned across the same area of the cathode ray tube that the other signals are scanned across. Moreover, at any time from the start of a scan, each signal is incident on the same area of the tube on which either of the other signals is incident at the same time from the start of the scan. Because of this spatial-temporal synchronization, the three signals are combined into one on the recording medium and the record thereon constitutes a hologram. An image of the object stored in the hologram can then be viewed by illuminating the hologram in much the same way that a conventional Leith and Upatnieks hologram is illuminated.

In another of these embodiments, the three resultant signals are combined electronically, once again preserving the proper synchronization among the three signals; and the combined signal is then scanned across the cathode ray tube. The record of this signal on a suitable recording medium likewise constitutes a hologram that is suitable for viewing.

It is a common factor of both embodiments that the spatial resolution required of the camera tube can be as little as one-fourth that of the camera tube needed to form an electromagnetic signal representative of a Leith and Upatnieks hologram of the same information-bearing beam.

With the first of these two embodiments, the spatial frequency bandwidth of the second hologram can be as little as one-half that of a comparable Leith and Upatnieks hologram that can reconstruct with equal quality an image of the same object. Consequently the resolution of the cathode ray tube and the recording medium need not be as great. Moreover, the temporal frequency bandwidth required to transmit the three signals from the point where they are formed by the television camera tube to the point where they are combined by the cathode ray tube can be reduced to one-fourth that of the bandwidth required to transmit a signal representative of a comparable Leith and Upatnieks hologram with the same reconstruction capabilities. However, because it takes thrice as much time to transmit the three signals as it does to transmit the one signal representative of the Leith and Upatnieks hologram, the time-bandwidth product is three-fourths that needed to transmit the comparable Leith and Upatnieks hologram.

The latter of these two embodiments can likewise reduce the spatial frequency bandwidth of the final hologram to one-half that of a comparable Leith and Upatnieks hologram. Moreover, if the three signals formed by the television camera tube are combined before they are transmitted to the location of the cathode ray tube, then for reasons that will be explained below the temporal frequency bandwidth required for transmission is one-half that required for transmission of a comparable Leith and Upatnieks hologram and the transmission time required is the same for both types of hologram. Hence, the time-bandwitdh product is but one-half that of a comparable Leith and Upatnieks hologram.

BRIEF DESCRIPTION OF THE DRAWING

These and other objects and features of my invention will be more readily understood from the following detailed description taken in conjunction with the accompanying drawing in which.

DETAILED DESCRIPTION OF THE DRAWING

1. A Preliminary Definition

From the very beginning, holography was not limited to the recording of the phase and amplitude of a modulated beam from an object illuminated with visible light. The first work in holography was an effort to record objects "illuminated" by X-rays; and recordings have been made of objects illuminated by microwaves, infrared frequencies, visible light and ultraviolet frequencies. Techniques have also been developed to make holograms of objects "illuminated" by acoustic waves. However, as a matter of convenience, and to some extent as a matter of custom in this art, in this specification I have chosen to describe the hologram formation process in terms of the exposure of a recording medium by light. It is to be understood that my use of the word "light" and similar words is intended to embrace the use of any form of "illumination," visible or invisible, in a hologram-forming technique and is not limited to the use of visible light. Similarly, other means than visible light can be used to "illuminate" the hologram if suitable detectors are employed.

2. Prior Art

Figure 1:
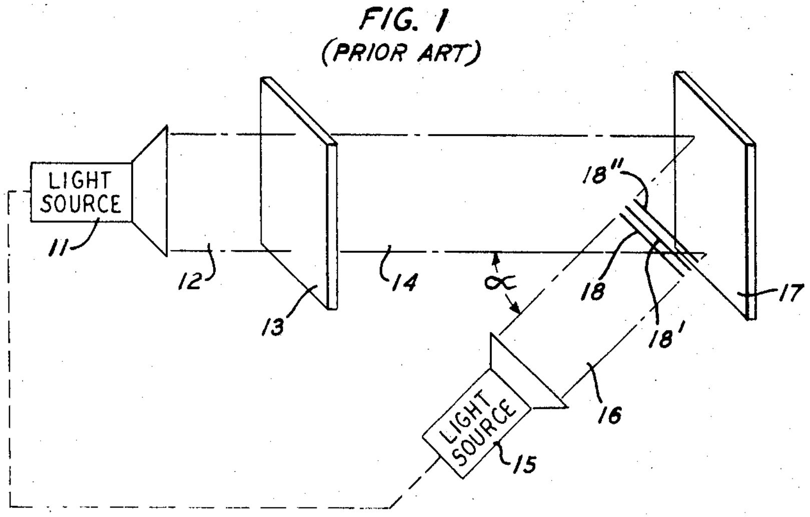
FIG. 1 (PRIOR ART)
FIG. 1 shows a schematic illustration of typical prior art apparatus used to form a hologram in accordance with the teaching of Leith and Upatnieks.

In FIG. 1 there is shown typical apparatus used to form a Leith and Upatnieks hologram, comprising a coherent light source 11, a two-dimensional transparent object 13 of which a hologram is to be formed, a second coherent light source 15 and a recording medium 17. A dotted line between light sources 11 and 15 is used to indicate that an object beam 12 and a reference beam 16 emanating from these sources are phase related.

To form a set of interference fringes containing information representative of object 13, an information-bearing beam 14 is created by directing object beam 12 through transparent object 13. Beam 14 is then incident on recording medium 17 where it interferes with reference beam 16.

It is also possible to store information representative of opaque two-dimensional objects or even three-dimensional objects. In such cases, information-bearing beam 14 is created by reflecting object beam 12 from the opaque object (not shown).

As shown in FIG. 1, information-bearing beam 14 is normal to recording medium 17; and reference beam 16 is incident on medium 17 at an angle $\alpha$ to the normal and, hence to information beam 14. In the customary language of this art, reference beam 16 is said to be "off-axis." While such a configuration is typical of the formation of a hologram according to the teaching of Leith and Upatnieks, other configurations are equivalent. Thus, the positions of the information and reference beams could be reversed or both beams could be incident on the recording medium at an angle to its normal.

After the recording medium has been exposed, the necessary steps are taken to preserve a record of the interference fringes. Then, to reconstruct the information stored in the fringe pattern, the record, which constitutes a hologram is illuminated by apparatus such as that shown in FIG. 2. From a coherent light source 21, an illuminating beam 22 is incident on the hologram, here depicted as element 23. A portion 24 of this beam transits hologram 23 without diffraction; the remainder is diffracted by the interference fringes of hologram 23. From the first order diffraction comes a virtual image beam 25 and a real image beam 26 that reconstruct images of the object 13 recorded in the interference fringes of hologram 23. Because there is a sufficiently large angle between information beam 14 and reference beam 16 during the formation of the hologram, the virtual and real images can be observed unobscured by each other or by undiffracted beam 24.

As was observed in discussing the background of the invention, the interference of two beams at an angle produces a set of interference fringes. Although this particular fact is well known and well explained in the literature, for an understanding of my invention an explanation of why this happens may be convenient. Shown in reference beam 16 of FIG. 1 are a series of parallel lines 18, 18′, 18″ perpendicular to the direction of propagation of the reference beam. Each of these lines 18 represents the crest of a plane wavefront of light in beam 16 and the distance between two lines is equal to the wavelength of the light. If beam 14 for the purposes of this explanation only is a similar beam containing no information, a similar series of parallel lines or plane wavefront crests can be thought of as located in beam 14 in a position perpendicular to its direction of propagation and hence parallel to medium 17.

It should now be apparent that at any given time parts of several different wavefront crests in beam 16 are incident on medium 17, the precise number depending directly on the angle $\alpha$ between beam 16 and the normal to recording medium 17 and inversely on the wavelength of beam 16. Thus if one assumes that the crest of the plane wavefront is at 0° phase, then in scanning the recording medium from top to bottom he passes continuously through several cycles of light at 0°, 90°, 180° and 270° phase and all the phases in between. In fact, the phase of the wavefront varies linearly in a vertical direction. In contrast, because beam 14 is normal to medium 17, the light of this beam has constant phase across its plane of incidence with medium 17.

Of course, what makes it possible to detect the relative phase of the two beams is interference between the wavefronts of beam 14 and those of beam 16. Thus, at the recording medium, a crest of a wavefront in beam 14 interferes constructively with the crests of the wavefronts in beam 16 but destructively with the troughs of those wavefronts; and the recording medium is affected the most where two crests interfere and the least where a crest and a trough interfere. Moreover, despite the passage of time and the continuous change of the phases of the incident wavefronts, maximum constructive interference always occurs at one group of locations and maximum destructive interference always occurs at another group. Consequently, there is formed on the recording medium a set of standing waves or interference fringes representative of the continuous phase changes across the angled reference beam incident on the recording medium. The number of said waves, or fringes, per unit distance is termed the spatial frequency of the waves or fringes and is equal to $(\sin \alpha)/\lambda$ where $\alpha$ is the angle of the reference beam and $\lambda$ is the wavelength. The distance between the centers of adjacent fringes is termed the fundamental period or the spatial period of the fringes and is equal to $\lambda/\sin \alpha$.

When there is information in beam 14, and especially when information beam 14 is created by reflection off an object, the pattern of wavefronts is typically much more complex and the crest of a given wavefront is not incident simultaneously on all of the recording medium. Moreover, different parts of a given wavefront are typically incident on the recording medium at different angles. Although this does not affect the phase distribution of reference beam 16 across the recording medium, it does affect the record of this phase distribution because the change in beam 14 changes the phase of its wavefronts at the recording medium and so changes the location of the points of constructive and destructive interference. Consequently, the location and the spatial frequency of the standing waves or interference fringes formed when there is information in beam 14 are different from the location and frequency when there is no information in beam 14.

This difference can be explained in conjunction with a more careful analysis of the concept of spatial frequency bandwidth, following K. S. Pennington's discussion in the aforementioned article in Microwaves. As has just been demonstrated, a beam incident on the recording medium at an angle to the normal creates a fringe pattern by interference with a beam incident normal to the recording medium, the frequency of the fringes depending on the angle of incidence. And this is just as true for those parts of the complex wavefront of an information-bearing beam that are incident at an angle to the normal as it is for an off-axis reference beam. However, because the directions of the different parts of the information beam, and hence their angles of incidence on the recording medium, vary over a limited solid angle, the spatial frequencies of the fringes that are formed also vary over a certain range. This range of frequencies is called a spatial frequency bandwidth.

Because of the interrelationship between the direction of the different parts of the information beam and the fringes they form, the term "spatial frequency bandwidth" is used both in speaking of the beam and in speaking of its hologram. Thus an information beam is typically described as having spatial frequencies from $-W$ to $+W$ about zero frequency and a bandwidth of $2W$ where $W$ is the maximum angular spatial frequency in the information beam and $W=2\pi(\sin \alpha')/\lambda$, $2\pi$ being a factor needed to express the spatial frequency as an angular spatial frequency, $\alpha'$ being the largest angle of incidence on the recording medium of any part of the beam and $\lambda$ being the wavelength of the beam.

When a Gabor hologram is formed of an information beam that has a bandwidth of $2W$, ranging from $-W$ to $+W$, the hologram ordinarily has a spatial frequency bandwidth of $4W$, ranging from $-2W$ to $+2W$. This occurs because the different parts of the complex wavefront interact with each other during the recording process to form a set of interference fringes that has a bandwidth of $4W$. As a result, when the Gabor hologram is illuminated, it is found that the beam projected from the hologram contains not only the original information beam but also a distortion factor introduced by the interference fringes that recorded the interaction of the various parts of the complex wavefront with each other. The spatial frequencies of this distortion term in the projected beam extend over a bandwidth of $4W$, from $-2W$ to $+2W$, thus obscuring the information beam whose frequencies range from $-W$ to $+W$.

To avoid this distortion and the other problems that arise when viewing a Gabor hologram, Leith and Upatnieks use an off-axis reference beam, incident on the recording medium during hologram formation at an angle large enough to separate the diffracted information-bearing beams from the undiffracted beam during reconstruction. This reference beam is, in effect, a carrier wave that separates the spatial frequencies of the information beam from those of the distortion term. Because the bandwidth of the information beam is $2W$, the reference beam must have a spatial frequency of at least $\pm 3W$, that is, a frequency at least three times the maximum spatial frequency in the information beam, to avoid interference during reconstruction between the diffracted beams and the distorted, undiffracted beam, which contains spatial frequencies ranging from $-2W$ to $2W$. Hence, the information recorded in a Leith and Upatnieks hologram has spatial frequencies ranging from $+2W$ to $+4W$ and from $-2W$ to $-4W$; and the range of spatial frequencies recorded on a Leith and Upatnieks hologram is therefore from $-4W$ to $+4W$ and the bandwidth is $8W$.

FIRST EMBODIMENT OF THE INVENTION

Figure 3A:
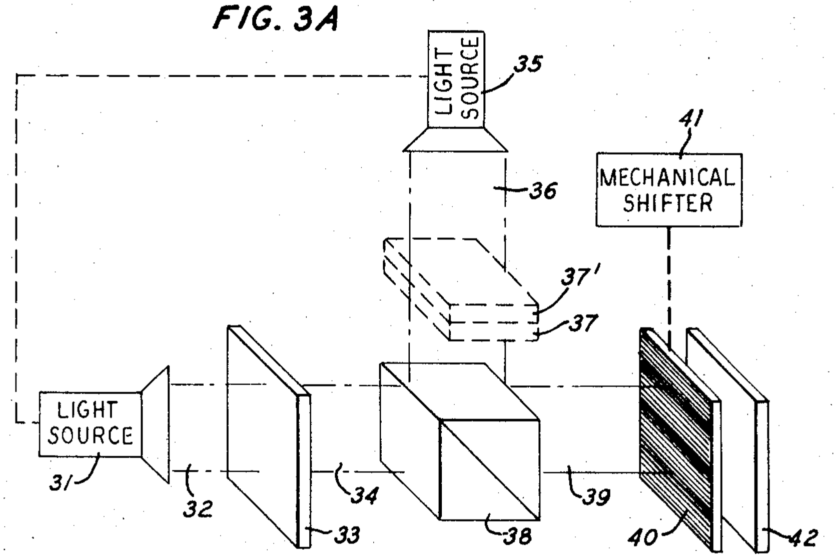
FIG. 3A shows a schematic illustration of apparatus used to practice one embodiment of my invention.

Referring now to FIG. 3A, there is shown illustrative apparatus that can be used to produce according to my invention a hologram that separates the diffracted information-bearing beams from the undiffracted beam even though the information beam and the reference beam are collinear during the formation of the hologram. The apparatus comprises a coherent light source 31, a two-dimensional transparent object 33 of which a hologram is to be formed, a second coherent light source 35, a beam splitter 38, a mask 40, a mask-shifting apparatus 41 and a recording medium 42 in contact with mask 40. With obvious modifications in setup and operation, opaque two-dimensional objects or three-dimensional objects may be substituted for transparent object 33 provided the coherence length of the light source is long enough. Because a plane wavefront reference beam 36 emanating from source 35 should be phase related to an object beam 32 emanating from source 31, it is best to use a system of beam splitter and mirrors to derive reference beam 36 from object beam 32. However, to avoid undue complication of FIG. 3A the common origin of the two beams is indicated by a dotted line between source 31 and source 35.

Mask 40 is typically a periodic array of thin, parallel opaque and transparent stripes, the number of opaque (or transparent) stripes per unit distance being the spatial frequency of the stripes on the mask. It is possible in practicing this embodiment of the invention to use many different types of masks, one of the most obvious being one in which the opacity and transparency of the different stripes are uniform throughout each stripe. In practice, however, I have used a mask having sinusoidally varying intensity transmissivity; for such a mask is relatively easy to make with apparatus similar to that shown in FIG. 1. However, in making such a mask, no object, such as object 13 shown in FIG. 1, is present; and the two light sources are so arranged with respect to the recording medium, which is a photographic plate, that they are located on opposite sides of the normal to the photographic plate with an angle $\beta$ between the normal and a beam projected from either of the light sources. The mask is formed by projecting from the two light sources two phase-related beams, both of which are comprised of trains of plane wavefronts. Without any further modulation, the two beams interfere on the photographic plate. As can be understood from the discussion of the Leith and Upatnieks hologram above, this interference produces an array of parallel interference fringes. As is known by those skilled in the art, the spatial frequency of the fringes is given by $(2 \sin \beta)/\lambda$ where $\beta$ is the angle between either of the beams and the normal to the photographic plate and where $\lambda$ is the wavelength of the beams. Similarly the angular frequency of the fringes is $2\pi(2 \sin \beta)/\lambda$, and the spatial period of the fringes is $\lambda/(2 \sin \beta)$. The photographic record of these fringes is then used as a mask.

Because the intensity of the interference fringes varies sinusoidally, the intensity transmissivity of the mask formed from the record of these fringes varies sinusoidally. Consequently, it is rather arbitrary to say where a transparent region on the mask begins or an opaque region ends. Nevertheless, the fact remains that there are opaque and transparent regions, or stripes, on the mask that can be shifted with respect to the recording medium in practicing my invention.

Figures 2, 3B:
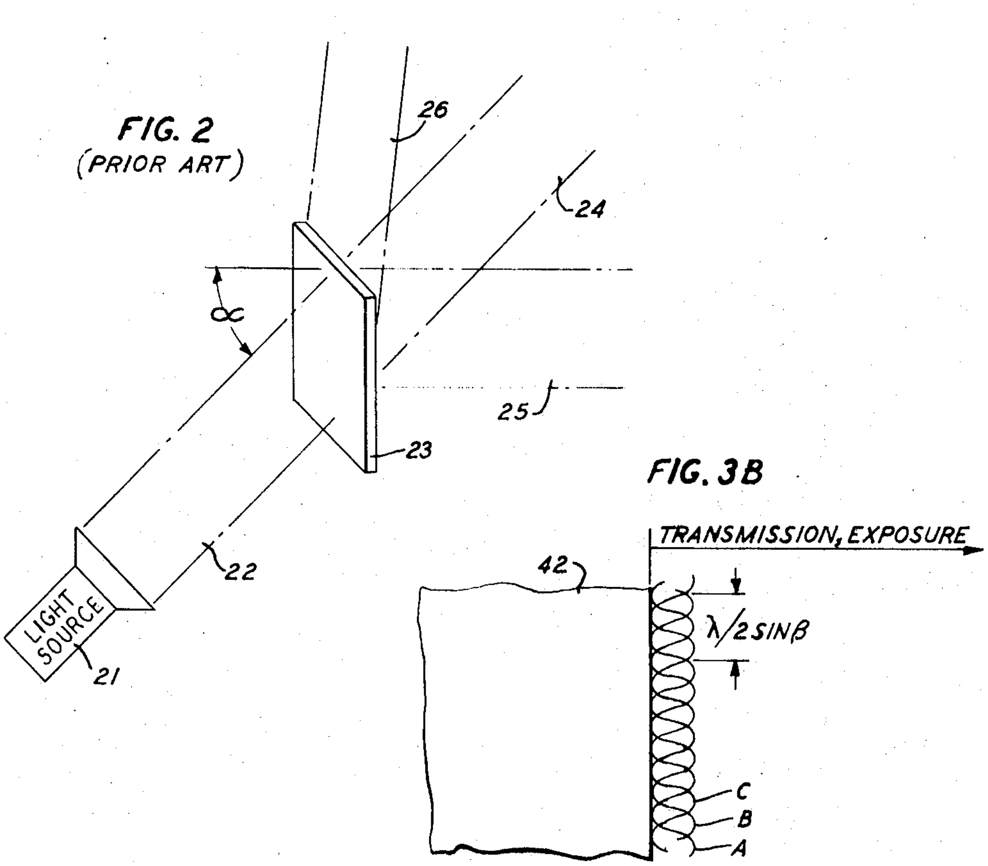
FIG. 2 (PRIOR ART), FIG. 3B
FIG. 2 shows a schematic illustration of apparatus used to illuminate holograms formed by the apparatus of FIG. 1.
FIG. 3B shows the relationship between two elements of FIG. 3A.

For example, as is described more fully below, the recording medium can be exposed by making a first exposure, shifting the mask relative to the recording medium by one-third the spatial period of the fringes, making a second exposure, shifting the mask another one-third of the spatial period and making a third, and final, exposure. The relationship between these movements and recording medium 42 is shown in FIG. 3B. On the left-hand side of the FIG. is an enlarged segment of medium 42; and on the right-hand side are three plots of the transmissivity of the mask with respect to distance across medium 42, each plot representing a different position of mask 40. Because the exposure of medium 42 depends on the transmissivity of the mask, these plots also represent the amount of the exposure across medium 42. Thus, plot A indicates the location of the mask of sinusoidally varying intensity transmissivity during the first exposure; and it also indicates the variation of exposure with distance across medium 42. Plot B indicates that the mask is shifted one-third its spatial period for the second exposure, and plot C indicates similar motion of the mask for the third exposure. Plots B and C also indicate similar shifts in the variation of exposure across medium 42.

To form in accordance with my invention a set of interference fringes containing information representative of transparent object 33, an information-bearing beam 34 is created by directing object beam 32 through object 33. Beam 34 is then incident on beam splitter 38 where it is combined with plane wavefront reference beam 36 to form a collinear beam 39. Because the phase of a beam is relative, the phase difference between beam 36 and either beam 32 or beam 34 may be assumed to be zero. Beam 39 is directed through mask 40 to recording medium 42 where a record is made on the exposed portion of medium 42 of the fringes that result from the interference of information beam 34 with reference beam 36. As shown in FIG. 3B, the amount of exposure varies sinusoidally across medium 42.

After this exposure, mask 40 is shifted by apparatus 41 a distance equal to one-third the spatial period of the stripes on the mask. At the same time the phase relation between beams 32 and 36, and therefore between beams 34 and 36, is shifted by 120°. This is accomplished by inserting into the path of beam 36 a one-third-waveplate 37. A second exposure of recording medium 42 is then made, the intensity of light beams 32 and 36 and the duration of the exposure being the same as in the first exposure. Information-bearing beam 34 is combined by beam splitter 38 with reference beam 36 that has been phase shifted 120° in transiting one-third-waveplate 37. The resultant collinear beam 39 is then directed through mask 40 onto the exposed portion of recording medium 42. Consequently, there is also recorded on medium 42 a fringe pattern that is a record of the interference between an information beam and a reference beam that have a 120° phase difference.

After the second exposure, mask 40 is again shifted in the direction it was shifted after the first exposure a distance equal to one-third the spatial period of the stripes on the mask. The phase difference between beams 32 and 36 is increased an additional 120°, for example, by inserting a second one-third-waveplate 37' into reference beam 36 or by skewing the orientation of the first waveplate 37 enough to effect an additional 120° phase shift. A third exposure of medium 42 is then made with the same light intensities, exposure time and procedures detailed above; and as a result, a fringe pattern is recorded that is a record of the interference between an information beam and a reference beam that have a 240° phase difference.

The necessary steps are then taken to preserve the record of the fringes formed on medium 42 in these three exposures. If, for example, the recording medium is an ordinary photographic emulsion, the emulsion must be developed and fixed; on the other hand, if the recording medium is a self-developing photographic film, there is no need for any additional procedures. The permanent record, which is called a hologram, can then be used to create images of the information stored in it.

Figures 4, 6:
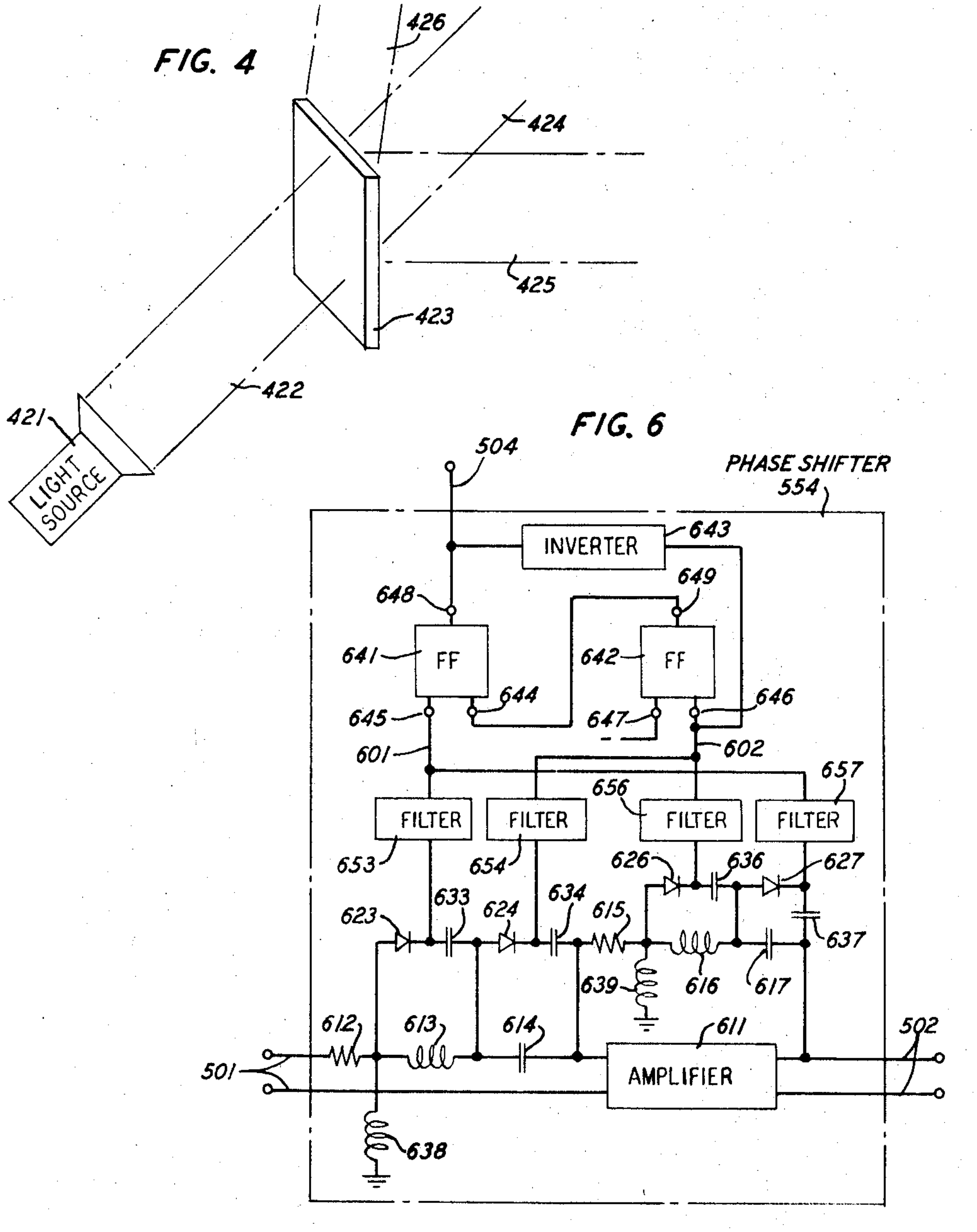
FIG. 4 shows a schematic illustration of apparatus used to illuminate holograms formed by the apparatus of FIG. 3A.
FIG. 6 shows a schematic illustration of an element of the apparatus of FIG. 5.

Typically, this information is reconstructed with apparatus such as that shown in FIG. 4. From light source 421, an illuminating beam 422 is incident on the hologram, here element 423. A portion 424 of this beam transits hologram 423 without diffraction. The remainder is diffracted by the interference fringes of hologram 423. From the first order diffraction come two beams 425 and 426, one of which reconstructs a virtual image of the object 33 recorded in the interference fringes or hologram 423 and the other of which reconstructs a real image. Clearly the three beams reconstructed from a hologram formed according to my teaching are very similar to those reconstructed from a Leith and Upatnieks hologram.

The reason for this similarity despite the differences in forming the holograms may be understood by noting the similar effect the two hologram-forming techniques have on the recording medium. As was explained above, the off-axis reference beam of the Leith and Upatnieks technique creates a continuously varying phase change across the recording medium; this phase change appears in the form of a set of interference fringes of determinable spatial frequency; and the spatial frequency of these fringes is, in effect, a carrier frequency. Mask 40, phase shifting and mask shifting as shown in FIGS. 3A and 3B likewise produce across recording medium 42 a phase change that appears in the form of a set of interference fringes of determinable spatial frequency; and this set of fringes is also, in effect, a carrier wave. In this case, however, the spatial frequency of these fringes depends on the spatial frequency of the stripes on the mask because the angle between subject beam and reference beam is zero. Indeed, to produce fringes having the minimum $3W$ spatial frequency of the carrier wave, the stripes of mask 40 have a spatial frequency of $3W$.

The embodiment I have detailed above is, of course, only illustrative of my invention. Coherent light sources 31 and 35 typically are lasers; but they could be sources of much shorter coherence length when the information to be stored is as simple as a two-dimensional transparency. Of course, if the coherence length is short, the optical path length of beams 34 and 36 from their common source (indicated by the dotted line) to recording medium 42 should be as much the same as possible. Moreover, in accordance with the definition of "light" in this specification, sources 31 and 35 are not limited to sources of visible light but can be sources of any radiation that can be used to form a hologram.

Although for convenience the invention has been described for the case where the reference beam has a plane wavefront, it is by no means so limited. The invention can be practiced with any other reference beam wavefront, for example, with a spherical wavefront reference beam, that is collinear with the information-bearing beam.

The phase relation between object beam 32 and reference beam 36 of FIG. 3A can be altered by many equivalent methods. For example, one-third waveplates can be inserted into object beam 32 or information beam 34 instead of reference beam 36. Nor is it necessary to use one-third waveplates The invention can also be practiced by phase-shifting object beam 32 of information beam 34 by $x$ degrees and phase-shifting reference beam 36 by $x+120°$.

Moreover, with appropriate changes in masking and phase shifting, similar systems can be devised that use any number of exposures greater than one. For example, in practicing my invention, I have formed the hologram in four exposures using a series of 90° phase shifts and a mask having an essentially sinusoidal variation in intensity transmissivity. Between each exposure I shift the mask by one-fourth its spatial period and the phase of the reference beam by 90°.

The exposure techniques detailed above for the case of holograms formed at three and four exposures suggests a general rule that between exposures both the mask should be shifted a distance equal to $1/N$ times the spatial period of the mask where $N$ is the total number of exposures used to form the hologram and the phase difference between the information beam and the reference beam should be shifted by $360°/N$. However, as will become more apparent in the course of the mathematical explanation given below, there is an even more general rule that allows in some cases for phase shifts not in accordance with the above formula.

When a hologram formed in accordance with my invention in three or more exposures is illuminated, three beams of light are projected from the hologram: an undiffracted beam containing distortion terms, and two diffracted beams, one of which is the original information-bearing beam and the other of which is its conjugate. However, when a hologram formed in two exposures is illuminated, it is not possible to separate so completely the information its conjugate and the distortion. Either the information beam also contains its conjugate or it contains the distortion; and the conjugate beam likewise also contains either the original information or the distortion.

Although masks with different periodic structures and different spatial frequencies may be just as good, I have found in my work that good angular separation of the images constructed from a transparent object can be obtained by using a mask of sinusoidally varying intensity transmissivity and a spatial frequency of 93.5 lines/millimeter.

The masking technique that has been described is likewise only illustrative of several that are available, some of which have the added advantage that they can be used with other techniques to reduce the spatial frequency bandwidth of the hologram. For example, three holograms could be made optically in three exposures of three separate recording media with the same phase shifting detailed above but with no physical masking at all. Referring to FIG. 3A, an information beam 34 is created by directing coherent light beam 32 through transparent object 33. Beam 34 is then combined with reference beam 36, having a first phase relation to beam 34, to form a collinear beam 39; and beam 39 is directed onto recording medium 42 without first traversing mask 40. This process is repeated twice more with, in each case, different recording media and 120° changes in the phase relation between reference beam 36 and information beam 34, thereby producing three holograms, the phase of the reference beam of the first hologram being 0°, of the second 120° and of the third 240°.

The three holograms are then processed to produce a single composite hologram of the same size with a phase variation across it. One way this could be accomplished manually is by dividing each of the three holograms into several horizontal strips of equal width. Then, retaining only every third strip of the first hologram beginning with the first, discard the rest. With the second hologram only every third strip beginning with the second is retained, and with the third hologram only every third strip beginning with the third. Finally, the three sets of strips are combined, each strip in its proper numerical order, thereby producing a single hologram. Because the reference beam used to form each set of strips had a different phase, the phase of the reference beam associated with the interference fringes of the composite hologram varies across the composite hologram as it does when a physically present mask and mask shifting are used during the three exposures of the recording medium. Methods for combining the three holograms electronically will be obvious from the embodiments to be described in conjunction with FIGS. 5 and 9.

SECOND EMBODIMENT OF THE INVENTION

The methods discussed thus far produce a hologram with a spatial frequency bandwidth equal to that of a comparable Leith and Upatnieks hologram. As has been noted above, however, such a bandwidth requires high-resolution and high-transmission capacity of any hologram transmission system, such as a television system, in which it is used. With the techniques shown below in FIGS. 5 and 9, these problems are alleviated. The spatial resolution of the photoelectric converter, such as a camera tube, that forms an electromagnetic signal representative of a hologram formed on its target can be reduced by a factor of four. The time-bandwidth product needed to transmit the hologram can be reduced by a factor of two; and the spatial resolution required of the display means and recording medium that convert the electromagnetic signal back to a hologram can also be reduced by a factor of two.

Figure 5:
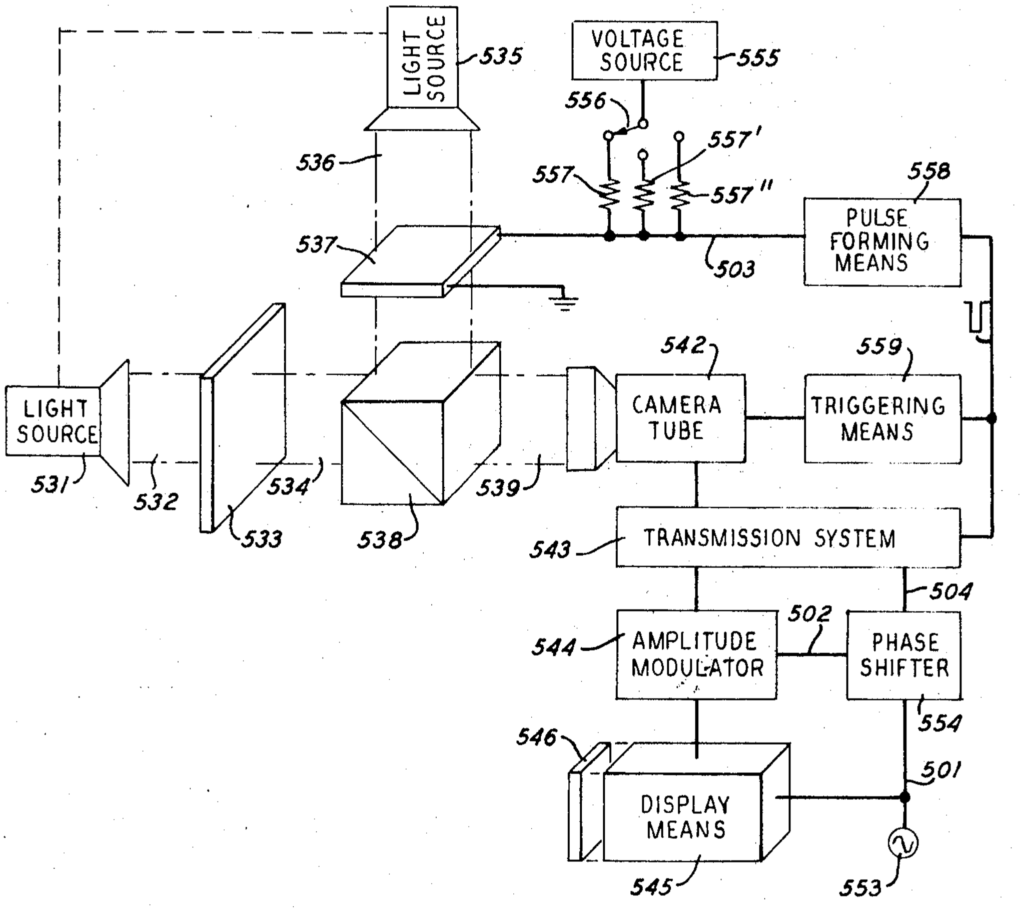
FIG. 5 shows a schematic illustration of apparatus used to practice a second embodiment of my invention.
Figure 9:
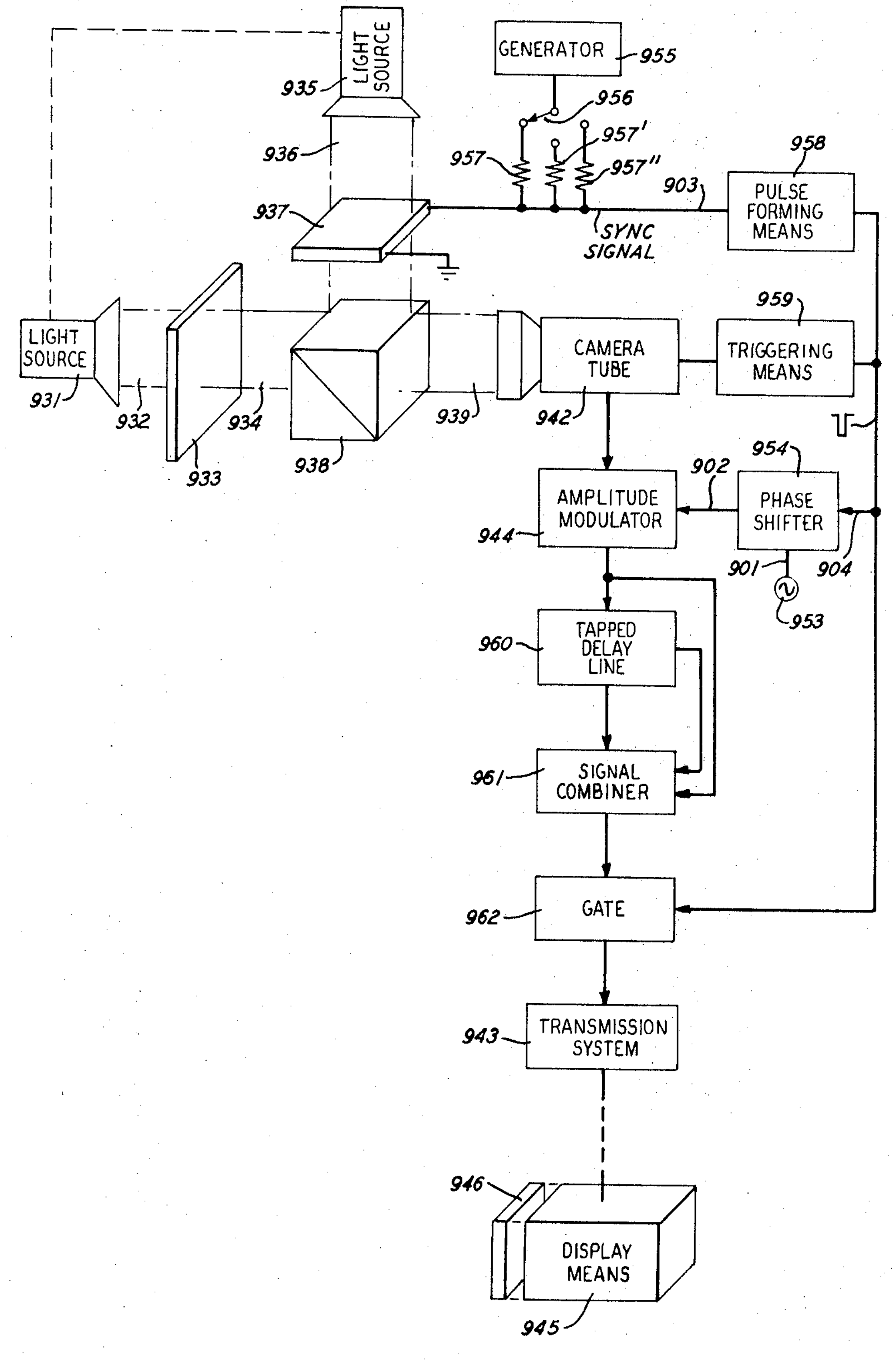
FIG. 9 shows a schematic illustration of apparatus used to practice a third embodiment of my invention.

FIG. 5 is similar to FIG. 3A in that it shows light sources 531 and 535, a transparent object 533, a phase shifter, here electro-optic phaseplate 537, a beam splitter 538 and a recording medium, here television camera tube 542. FIG. 9 is similar to both FIGS. 3A and 5 in that it shows the same elements in a 900 series.

With obvious modifications in setup and operation, opaque two-dimensional objects or three-dimensional objects may be substituted for transparent object 533 or 933 provided the coherence length of the light source is long enough. Because a plane wavefront reference beam 536 emanating from source 535 should be phase related to an object beam 532 emanating from source 531, it is best to use a system of beam splitter and mirrors to derive reference beam 536 from object beam 532. However, to avoid undue complication of FIG. 5 the common origin of the two beams is indicated by a dotted line between source 531 and source 535. The same considerations also dictate the use of a dotted line between sources 931 and 935 of FIG. 9.

As in FIG. 3A, an interference pattern is formed on the recording medium, but in this case the record made is in the form of an electromagnetic signal. Unlike FIG. 3A, the recording medium is not masked but an effect related to that of physical masking is produced by electronic means.

The remaining components shown in FIG. 5 are a transmission system 543 for transmitting the electromagnetic signal to the point where the interference pattern is to be reconstructed, an amplitude modulator 544 for modifying the electromagnetic signal to produce the effect of masking, a display means 545 for converting the signal back to a spatial pattern and a recording medium 546 for recording the pattern. In addition, an AC signal generator 553 and a phase shifter 554 form the signal used by modulator 544 to modify the signals transmitted by system 543; and a DC voltage source 555, a switch 556, resistors 557, 557' and 557'', a pulse-forming means 558 and a triggering means 559 provide synchronization to certain of the components.

To form a set of interference fringes containing information representative of object 533 in FIG. 5, information-bearing beam 534 is created by directing object beam 532 through object 533. Beam 534 is then incident on beam splitter 538 where it is combined with plane wavefront reference beam 536 to form collinear beam 539. Beam 539 is directed onto camera tube 542 where a record in the form of an amplitude-modulated electromagnetic signal is made of the fringes that result from the interference of information beam 534 with reference beam 536. As is well known in the art, this signal, which will be referred to below as the information signal, is formed by raster-scanning an electron beam across a spatial record of the interference fringes, thereby converting the spatial record into a temporal record or signal.

The information signal is then fed to transmission system 543 that sends the signal to the point where the information stored therein is to be viewed. There amplitude modulator 544 multiplies the information signal with a first bipolar periodic signal, thereby producing, as will be explained below, an effect similar to masking. Typically, the periodic signal is a sinusoidal signal, as is assumed in the discussion below; however, any periodic signal with a strong first harmonic can be used. The resultant signal is then displayed by a display means 545 and recorded on recording medium 546. Because multiplication with a sinusoidal signal has an effect similar to masking, the pattern recorded on medium 546 is a set of interference fringes similar to the set that is recorded on medium 42 of FIG. 3A by the first exposure. Moreover, part of this set of fringes is, in effect, a carrier wave just as part of the set of fringes recorded on medium 42 of FIG. 3A or on a Leith and Upatnieks hologram is, in effect, a carrier wave. In the apparatus of FIG. 5, however, the average frequency of the carrier wave fringes is determined by the temporal frequency of the sinusoidal signal that modulates the information signal in modulator 544 rather than by the spatial frequency of the stripes of mask 40 of FIG. 3A or the angle between the reference and information beams in the Leith and Upatnieks hologram. Furthermore, for reasons that will be detailed below, the temporal frequency (or carrier frequency) need not be as great as the equivalent of $\pm 3W$, which is the spatial frequency of the carrier in the embodiment shown in FIG. 3A and in a comparable Leith and Upatnieks hologram.

The bipolar sinusoidal signal is formed by AC generator 553 and fed through line 501 to phase shifter 554. As will be described below, the phase of the signal is there shifted and is then fed through line 502 to amplitude modulator 544. Typically, display means 545 is a cathode ray tube that forms on its screen a pattern of varying light intensities representative of the resultant signal; and recording medium 546 is a photographic film. Alternatively, display means 545 is an electron gun and associated deflection means similar to that described in the U.S. Pat. application, now abandoned, of L. H. Enloe et al., Ser. No. 635,124, filed on May 1, 1967 and assigned to Bell Telephone Laboratories, Incorporated; and recording medium 546 is a thermoplastic material.

After the signal representative of the first set of interference fringes is formed by television camera tube 542, the phase relation between beams 532 and 536, and therefore between beams 534 and 536, is shifted by 120°. As mentioned in the description of FIG. 3, this can be accomplished by inserting into the path of beam 536 a one-third waveplates However, to take advantage of the high speeds offered by the electronic systems used in this embodiment, phase shifting is best accomplished by electro-optic phaseplate 537 that can be rapidly switched by different applied voltages from voltage source 555. Once the phase shift of 120° is made, camera tube 542 is again exposed and a record is made of the fringes that result from the interference of information beam 534 with reference beam 536. This record is then sent by transmission system 543 to the viewing location. For reasons that will be explained below, it is there multiplied in modulator 544 by a second bipolar sinusoidal signal, similar to the first in every way but that its phase has been shifted 120°. The resultant signal is then displayed by means 545 and recorded on medium 546 on exactly the same area of medium 546 that already contains a record of the previous signal.

As has been explained in the summary of the invention, display means 545 must be properly synchronized to scan each resultant signal in this fashion. More specifically, if display means 545 is a cathode ray tube, each signal must be scanned across the same area of the screen of the tube; and if the display means and recording medium 546 are an electron gun and a thermoplastic medium, then the electron beam representative of each signal must be scanned across the same area of the medium on which the electron beams representative of previous signals are scanned. Moreover, at any time from the start of a scan, each signal must be incident on the same area of the display means on which any other signal is incident at the same time from the start of its scan. Because of this spatial-temporal synchronization, the first two resultant signals are combined into one on the recording medium.

After the signal representative of the second set of interference fringes is formed by camera tube 542, a third exposure is made using a phase shift of 240°. A third signal is formed representative of the interference fringes and is processed in similar fashion, the phase of a third sinusoidal multiplying signal being 240°. The resultant signal is likewise displayed by means 545 and recorded on recording medium 546. Once again, display means 545 must be properly synchronized so that the resultant signal is recorded on exactly the same area of medium 546 that contains a record of the previous signals. Because of this spatial-temporal synchronization, the three signals are combined into one on the recording medium and the record of interference fringes thereon constitutes a hologram. As will be explained further below, the spatial frequency of these fringes depends on the nature of beam 539 and the frequency of the bipolar sinusoidal signal fed to modulator 544. As will also be explained, an image of the object stored in the hologram can then be viewed by illuminating the hologram in much the same way that a conventional Leith and Upatnieks hologram is illuminated.

The phase shifts in reference beam 536, the scanning of camera tube 542, and the phase shifts in the bipolar sinusoidal signal applied by modulator 544 all require synchronization. A schematic of one such way that this might be accomplished is shown in FIG. 5. DC voltage source 555 produces a DC voltage that can be switched by switch 556 to one of three different resistors 557, 557′ and 557″, thereby producing one of three different voltage outputs. With proper selection of the resistors, part of this voltage output is used to bias electro-optic phaseplate 537 to produce the desired phase shifts in reference beam 536.

The remainder of the output is used to synchronize other parts of the apparatus. For example, for each change in voltage on line 503 from source 555, pulse-forming means 558 produces a single, negative pulse signal. Part of this signal is fed to triggering means 559 where it initiates a scan of the image formed on camera tube 542. Because a new pulse is formed whenever the phase of reference beam 536 is changed, the pulses can be used to synchronize the scanning with the phase shifting. The rest of the signal is used to determine the phase of the sinusoidal signal fed from generator 553 to modulator 544. The precise operation of phase shifter 554 will be explained below in conjunction with FIG. 6. Here it is sufficient to note that the pulse signal can be used to change the phase of the sinusoidal signal in synchronization with changes in the phase of reference beam 536 because of a new pulse is formed whenever the phase of reference beam 536 is changed.

It is also necessary that display means 545 be synchronized both with camera tube 542 so as to record each of the three signals on the same area of medium 546 and with the signal output of generator 553 and phase shifter 554 so as to preserve the phase differences in the three signals. Synchronization with camera tube 542 is provided by the standard synchronization signals of any television camera tube. Synchronization with the signal output of generator 553, which requires that the frequency of the bipolar sinusoidal signal be some integral multiple of the frequency with which display means 545 scans and that the two frequencies be phase locked, is readily achieved by deriving the horizontal sweep frequency of display means 545 from the sinusoidal signal produced by generator 553 by frequency division.

In FIG. 6 there is shown an illustrative embodiment of the phase shifter 554 that is used to modify the phase of the sinusoidal signal produced by generator 553 so that three signals of different phase can be fed to modulator 544. The phase shifter, adapted from a similar device shown at pp. 15—18 in Pulse Digital and Switching Waveforms by Millman and Taub (1965), is essentially an operational amplifier comprising input leads 501 from signal generator 553, an amplifier 611, an impedance, comprising a resistor 612, an inductor 613 and a capacitor 614 connected in series with amplifier 611, a second impedance, comprising a resistor 615, an inductor 616 and a capacitor 617 connected in parallel with amplifier 611 and output leads 502 to modulator 544. Switching means, which will be discussed below, are also part of the phase shifter. In parallel with each of the inductors and the capacitors, one of four diodes 623, 624, 626 and 627 is so connected that when forward biased it conducts an applied signal around the particular inductor or capacitor to which it is connected. Capacitors 633, 634, 636 and 637 isolate diodes 623, 624, 626 and 627, respectively, so that the biasing of any diode does not affect the biasing of the others. Capacitors 633, 634, 636 and 637 have large capacitances and do not affect the sinusoidal signal fed to the phase shifter from AC generator 553. Inductors 638 and 639 ground the diodes. Because their inductance is large, the inductors do not affect the sinusoidal signal.

Resistors 612 and 615 have equal resistance, $R$; inductors 613 and 616 have equal inductive reactance, $X_L$; and capacitors 614 and 617 have equal capacitive reactance, $X_C$. Moreover, the inductive reactance equals the capacitive reactance and also equals the resistance of either of resistors 612 or 615 times the tangent of 60°, i.e., $X_L=X_C=(R)$ (tan 60°).

As pointed out in equation 1—30 of Millman and Taub, the overall voltage gain of the operational amplifier is negative and equal in magnitude to the second impedance divided by the first. Consequently, when inductors 613 and 616 and capacitors 614 and 617 are bypassed by forward biasing the four diodes 623, 624, 626 and 627 connected in parallel with them, a phase shift of 180° is produced in the signal fed from generator 553 to phase shifter 554. On the other hand, when only inductor 613 and capacitor 617 are bypassed by forward-biasing diodes 623 and 627, a phase shift of 300° (or −60°) is produced in the signal fed to the phase shifter; and when only capacitor 614 and inductor 616 are bypassed by forward-biasing diodes 624 and 626, a phase shift or 60° is produced in the signal fed to the phase shifter. As a result, of this bypassing, three sinusoidal signals each having a phase that differs by 120°, are fed at different times from phase shifter 554 to modulator 544. Moreover, because the phases of these signals are only relative, in further discussion of the bipolar sinusoidal signals fed to modulator 544, the signals will be assumed to have phases of 0°, 120° and 240°.

Typically, the diodes used to bypass elements 613, 614, 616 and 617 are P-I-N diodes. These diodes are biased by the voltage outputs at certain of the terminals of a counting circuit also shown in FIG. 6, similar to that shown at pp. 668—670 of Millman and Taub (1965). The circuit is essentially a count-3 circuit, comprising two flip-flop multivibrators 641 and 642 and an inverter 643, and is driven by the negative pulse signals formed by pulse-forming means 558, transmitted by transmission system 543 and fed through line 504 to phase shifter 554. Illustratively, the two flip-flops responds only to negative pulse signals; and in the zero state, terminal 644 of flip-flop 641 is more negative than terminal 645 and terminal 646 of flip-flop 642 is more negative than terminal 647.

To switch the circuit to its one state, a negative pulse from pulse-forming means 558 is applied to terminal 648 of flip-flop 641, thereby causing terminal 644 to become more positive than terminal 645. As a result, a positive pulse is applied to terminal 649 of flip-flop 642. Because the flip-flops are only sensitive to negative pulses, however, this does not affect flip-flop 642.

When a second negative pulse from means 558 is applied to terminal 648 to switch the counting circuit to its two state, it causes terminal 644 to become momentarily more negative than terminal 645. However, the result of this is that terminal 649 of flip-flop 642 receives a negative pulse. This pulse causes terminal 646 of flip-flop 642 to become more positive than terminal 647; and consequently, a positive pulse is produced that is fed to inverter 643 where it becomes a negative pulse. This negative pulse is then fed to terminal 648 where it causes terminal 644 to become, once again, more positive than terminal 645. The resulting positive pulse applied to terminal 649 has, of course, no effect; and the final voltage relationships in the second state of the circuit is that terminal 644 is more positive than terminal 647. It should also be noted that the brief time when terminal 644 is more negative than terminal 645 is so short that for our purposes it may be ignored. Still another negative pulse fed to terminal 648 from pulse-forming means 558 restores the whole system to its zero state.

The voltage relationships of terminals 644, 645, 646 and 647 can be represented by the following table:

| | Terminal 644 | Terminal 645 | Terminal 646 | Terminal 647 |
|---|---|---|---|---|
| State: | | | | |
| 0 | − | + | − | + |
| 1 | + | − | − | + |
| 2 | + | − | + | − |

Because switching from one state to another is initiated by a pulse signal from pulse-forming means 558 and because a new pulse signal is formed whenever the phase of reference beam 536 is changed, the different states are synchronized with the different phases of the reference beam. Hence the voltages at certain of the terminals 644, 645, 646 and 647 during the different states can be used to bias the diodes so as to synchronize the phase of the bipolar sinusoidal signal fed to modulator 544 with the phase of reference beam 536.

Specifically, the voltage on terminal 645 is applied to diodes 623 and 627 by line 601, one branch of which connects terminal 645 to diode 623 by way of filter 653 and the other branch of which connects terminal 645 to diode 627 by way of filter 657. Similarly, the voltage on terminal 646 is applied to diodes 624 and 626 by line 602, one branch of which connects terminal 646 to diode 624 by way of filter 654 and the other branch of which connects terminal 646 to diode 626 by way of filter 656. Filters 653, 654, 656 and 657 pass the DC voltage at terminals 645 and 646; however, they block the passage of the AC signal applied to the phase shifter on lines 501. As has been mentioned above, capacitors 633, 634, 636 and 637 isolate diodes 623, 624, 626 and 627, respectively, so that the biasing of any diode does not affect the biasing of the others.

As a result of the above connections, when the counting circuit is in its zero state, diodes 623 and 627 are reverse biased and diodes 624 and 626 are forward biased. Consequently, a phase shift of 60° is produced in the signal fed to phase shifter 554 through lines 501. When the counting circuit is in its one state, all four diodes are forward biased; and a phase shift of 180° is therefore produced. When the counting circuit is in its two state, only diodes 623 and 627 are forward biased; and hence a phase shift of 300° (or −60°) is produced. Because these phases are only relative, in further discussion of the bipolar sinusoidal signals fed to modulator 544 via lines 502, the signals will be assumed to have phases of 0°, 120° and 240°.

Figure 7:
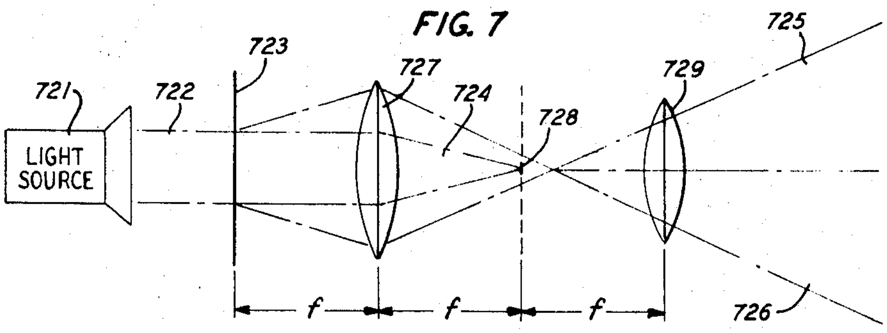
FIG. 7 shows a schematic illustration of apparatus used to illuminate holograms formed by the apparatus of either FIG. 5 or FIG. 9.

The record on medium 546 of the intensity patterns displayed by means 545 is a set of interference fringes that constitute a hologram. In FIG. 7, this hologram, shown as element 723, is viewed by illuminating it with a beam 722 of coherent light emanating from a light source 721. A portion 724 of this beam transits hologram 723 without diffraction. The remainder is diffracted; and from the first order diffraction come two beams 725 and 726, one of which reconstructs a virtual image of the object stored in hologram 723 and the other of which reconstructs a real image.

However, as will be explained below, unlike a conventional Leith and Upatnieks hologram, undiffracted beam 724 in this instance is a parallel beam containing no information. Hence it is easily filtered out by a converging lens 727 situated so that hologram 723 is in its front focal plane and an opaque object or stop 728 located in its back focal plane. A second converging lens 729 located two focal lengths from lens 727 restores the original curvature of diffracted beams 725 and 726. Anyone skilled in the art will recognize this configuration as a standard spatial filtering arrangement.

Because undiffracted beam 724 can be converged to a point and there filtered out, the spatial frequency of the interference fringes formed on recording medium 546 need not be as great.

As has been explained above, the spatial frequency of the fringes recorded on medium 42 of FIG. 3A must be high enough to produce during reconstruction of the hologram at least a minimum angle between each diffracted beam and the undiffracted beam and hence at least a minimum angle between the two diffracted beams as well. If, however, the undiffracted beam is eliminated by filtering, the angle between the diffracted beams can be reduced and therefore the spatial frequency of the fringes can be reduced. In other words, that part of the spatial frequency of the carrier wave that was required to separate the diffracted beams from the undiffracted beam is no longer needed. Because the spatial frequency of the fringes determines the resolution required to display means 545 and recording medium 546, a reduction in the minimum angle between the two diffracted beams reduces the resolution required on means 545 and medium 546. Because the spatial frequency of the fringes that constitute the carrier wave is determined by the frequency of the bipolar sinusoidal signal with which each output of camera tube 542 is multiplied, the spatial frequency of the fringes is reduced simply by reducing the temporal frequency of the sinusoidal signal.

MATHEMATICAL ANALYSIS AND COMPARISON OF THE FIRST AND SECOND EMBODIMENTS OF THE INVENTION

Multiplication of the electromagnetic information signal formed by camera tube 542 with the sinusoidal signal in the three instances detailed above produces an effect related to physical masking because the sinusoidal signal produces a variation with time in the amplitude of the electromagnetic information signal and when this signal is displayed by means 545 and recorded on medium 546 this variation of amplitude with time becomes a variation of intensity with space. The relationship between physical masking and multiplying a signal with a bipolar sinusoidal signal is best explained by an example that shows mathematically how masking and multiplying affect a signal.

Information beams 34 of FIG. 3A and 534 of FIG. 5 have a complex amplitude that may be represented by $A$; reference beams 36 and 536 have a real amplitude that may be represented by $B$. Beam splitters 38 and 538 add these two beams together to form beams 39 and 539 having an amplitude of $(A+B)$; and the intensity, $I_1$, of either beam 39 or beam 539 is:

$$I_1=(A+B)(A^*+B)=AA^*=B^2+AB+A^*B \quad (1)$$

Where $A^*$ is the complex conjugate of $A$.

Equation (1) is a function of a complex variable describing the variation of intensity with location in the beam formed by beam splitters 38 and 538. The first two terms of equation (1) represent the distortion in either of beam 39 or 539 caused by interaction of the components of the information beam with each other and by the interaction of the wavefront of the reference beam with itself. The other two terms represent the information contained in either of beams 39 or 539.

Because the graphical representation of a function of a complex variable and of the operations performed on it by the elements of this invention is ordinarily very difficult, FIG. 8 illustrates only the trivial case where the amplitudes of both beam 34 and beam 36 and both beam 534 and beam 536 are real, constant and equal. Moreover, because the purpose of FIG. 8 is only to compare certain waveforms, the amplitudes of the beams are expressed in relative terms and hence are dimensionless. Assuming then that the relative amplitude of each of the four beams is one, then the relative intensities of beams 39 and 539 are four at any point in the beams, as is shown in plot A of FIG. 8A. The above assumptions that the amplitudes of beams 34 and 36 and beams 534 and 536 are real and constant can only be met if none of the beams contains information, a situation that would not be encountered. Nevertheless, because the trivial case in conveniently depicted and does give an understanding of how nontrivial cases work out, it has been illustrated in FIG. 8.

In FIG. 3A, beam 39 transits a mask 40 and is recorded by recording medium 42. If mask 40 has an intensity transmissivity that varies sinusoidally from zero to 100 percent, the transmissivity, $T_1$, of the mask can be described mathematically by the expression:

$$T_1 = \tfrac{1}{2} + \tfrac{1}{4}\left(e^{j\omega_1 x_1} + e^{-j\omega_1 x_1}\right) \qquad (2)$$

where, with reference to the process detailed in conjunction with FIG. 1 for forming such a mask, $\omega_1$ is the angular spatial frequency of the stripes on the mask, $\omega 1 = 2\pi(2 \sin \beta)/\lambda$ where $\beta$ is the angle between the normal and either of the two beams used to form the mask, $\lambda$ is the wavelength of the beams, and $X_1$ is the direction in the plane of the mask that is perpendicular to the stripes of the mask. Equation (2) is shown as plot B of FIG. 8B. Note that it is the same as plot A of FIG. 3B.

The relative intensity, $I_{1_R}$, recorded on medium 42 is equal to the product of equations (1) and (2):

$$I_{1_R} = (1/2)(AA^* + B^2 + AB + A^*B) + (1/4)\{e^{j\omega_1 x_1}(AA^* + B^2 + AB + A^*B) + e^{-j\omega_1 x_1}(AA^* + B^2 + AB + A^*B)\} \qquad (3)$$

Figure 8A:
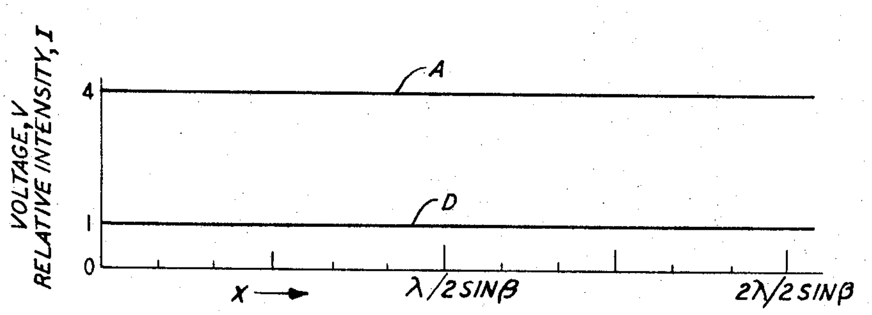
FIGS. 8A, 8B, 8C, 8D, 8E, 8F and 8G are several graphs representing the intensities of certain light beams and fringe patterns formed by the apparatus of FIGS. 3, 5 and 9 and the voltages of certain electromagnetic signals formed by the apparatus of FIGS. 5 and 9.
Figure 8B:
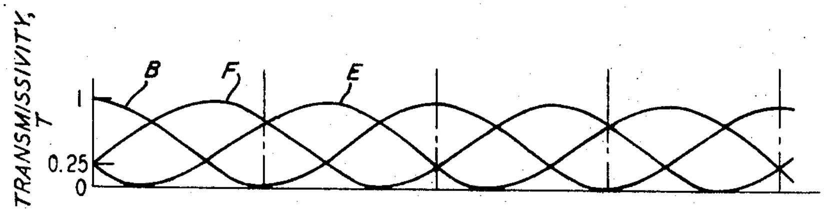
Figure 8C:
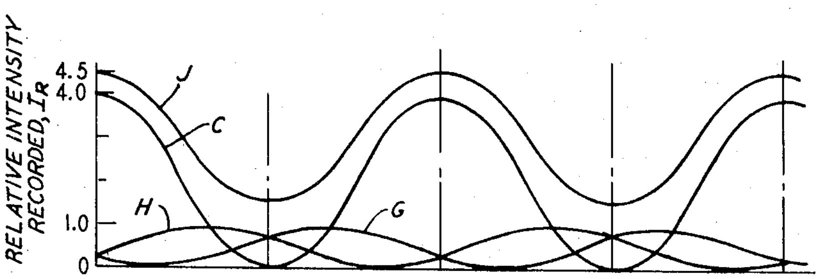

Relationship (3) is shown as plot C of FIG. 8C.

Note that the intensity has a DC component and a sinusoidally varying component, the sinusoidally varying component being observable as fringes. Note also that the angular frequency of this sinusoidal variation of the intensity is identical to the angular spatial frequency of the mask, $\omega_1$, as one might expect.

For the second and third exposures described in conjunction with FIG. 3, the phase of reference beam 36 is shifted 120° and 240° , respectively; and the amplitude of the reference beam in these exposures is therefore $Be^{j2\pi/3}$ and $Be^{j4\pi/3} (= Be^{-j2\pi/3})$. Consequently, the relative intensity, $I_2$, of beam 39 during the second exposure is:

$$I_2 = AA^* + B^2 + ABe^{-j2\pi/3} + A^*Be^{+j2\pi/3}; \qquad (4)$$

and the relative intensity, $I_3$, of beam 39 during the third exposure is:

$$I_3 = AA^* + B^2 + ABe^{+j2\pi/3} + A^*Be^{-j2\pi/3}. \qquad (5)$$

Under the assumption that the relative amplitude of beams 34 and 36 is one, $I_2$ and $I_3$ equal one because $$1 + e^{j2\pi/3} + e^{-j2\pi/3} = 0. \qquad (6)$$

The relative intensities, $I_2$ and $I_3$, are shown as plot D in FIG. 8A.

The mask is also shifted between each exposure by an amount equal to one-third the distance between the centers of adjacent fringes. Because the phase change over the center-to-center distance between adjacent fringes is 360°, or $2\pi$, each mask shift can be represented by adding $2\pi/3$ to the second term of the mathematical expression for the intensity transmissivity of the mask in its former position. Consequently, the intensity transmissivity of the mask in its former position. Consequently, the intensity transmissivity, $T_2$, during the second exposure is:

$$T_2 = (\tfrac{1}{2}) + (\tfrac{1}{4})\left(e^{j\omega_1 x_1} e^{j2\pi/3} + e^{-j\omega_1 x_1} e^{-j2\pi/3}\right); \qquad (7)$$

and during the third exposure the intensity transmissivity, $T_3$, is:

$$T_3 = (\tfrac{1}{2}) + (\tfrac{1}{4})\left(e^{j\omega_1 x_1} e^{-j2\pi/3} + e^{-j\omega_1 x_1} e^{j2\pi/3}\right). \qquad (8)$$

(Recall that $e^{j4\pi/3} = e^{-j2\pi/3}$). Note that transmissivity of the mask itself remains the same despite the shift in the location of the mask; however, the transmissivity as a function of location does change. Hence where $-x$ is the direction in which the mask is shifted, the transmissivity of the mask with respect to $x$ is that shown by plot E after the first shift and that shown by plot F after the second shift. Plots E and F of FIG. 8B are, of course, the same as plots B and C of FIG. 3B.

The relative intensity, $I_{2_R}$, recorded by the second exposure is equal to the product of equations (4) and (7):

$$I_{2_R} = (1/2)(AA^* + B^2 + ABe^{-j2\pi/3} + A^*Be^{j2\pi/3}) + (1/4)\{e^{j\omega_1 x_1}(AA^*e^{j2\pi/3} + B^2e^{j2\pi/3} + AB + A^*Be^{-j2\pi/3}) + e^{-j\omega_1 x_1}(AA^*e^{-j2\pi/3} + B^2e^{-j2\pi/3} + ABe^{j2\pi/3} + A^*B)\}, \qquad (9)$$

which is shown as plot G in FIG. 8C; and the relative intensity, $I_{3_R}$, recorded by the third exposure is equal to the product of equations (5) and (8):

$$I_{3_R} = (1/2)(AA^* + B^2 + ABe^{j2\pi/3} + A^*Be^{-j2\pi/3}) + (1/4)\{e^{j\omega_1 x_1}(AA^*e^{-j2\pi/3} + B^2e^{-j2\pi/3} + AB + A^*Be^{j2\pi/3}) + e^{-j\omega_1 x_1}(AA^*e^{j2\pi/3} + B^2e^{j2\pi/3} + ABe^{-j2\pi/3} + A^*B)\}, \qquad (10)$$

which is shown as plot H in FIG. 8C.

Figure 8D:
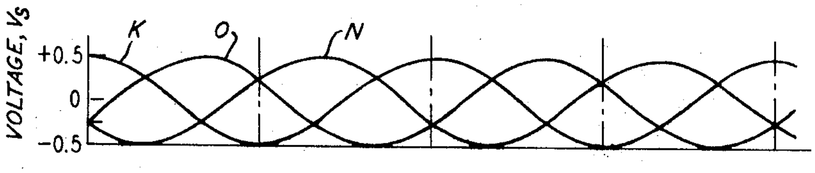
Figure 8E:
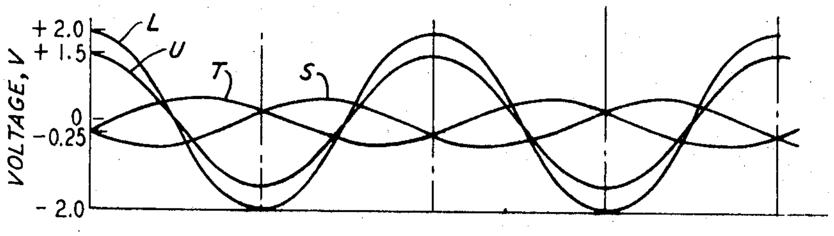
Figure 8F:
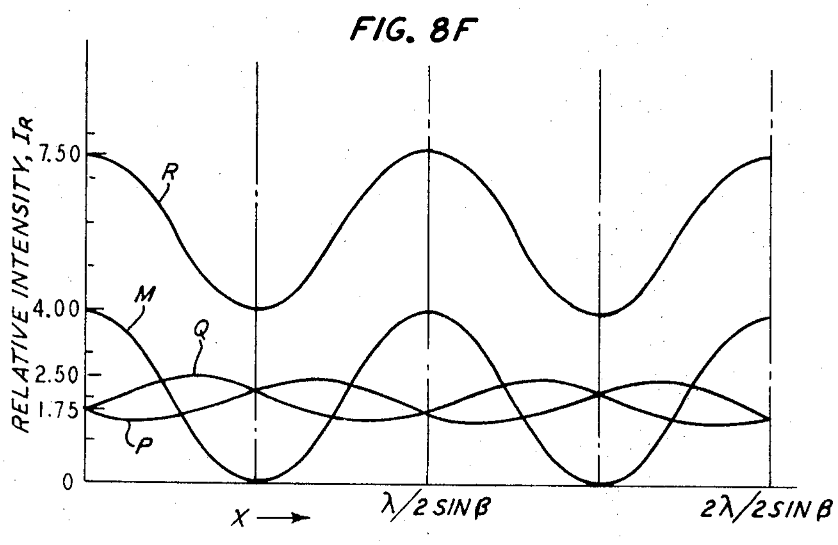
Figure 8G:
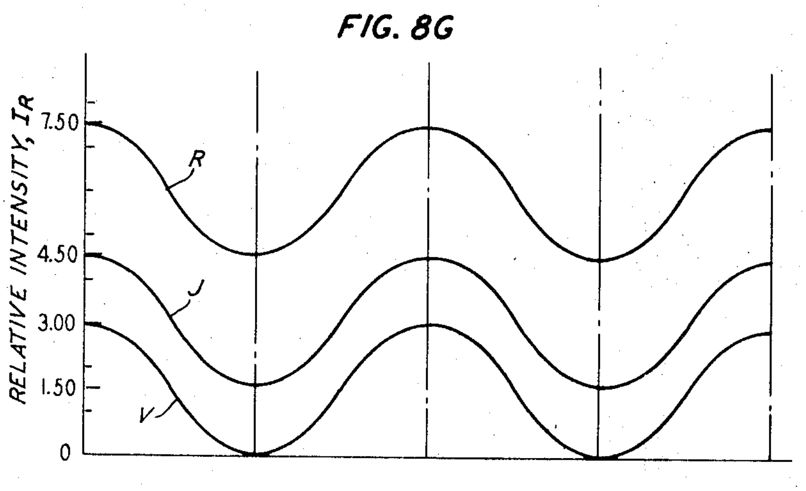

On recording medium 42 these three intensities are summed to yield the total intensity, $I_{T_R}$, given by:

$$\begin{aligned} I_{T_R} &= I_{1_R} + I_{2_R} + I_{3_R} \\ &= (1/2)\{AA^*(1+1+1) + B^2(1+1+1) + AB(1 + e^{-j2\pi/3} + e^{j2\pi/3}) + A^*B(1 + e^{j2\pi/3} + e^{-j2\pi/3})\} \\ &\quad + (1/4)e^{j\omega_1 x_1}\{AA^*(1 + e^{j2\pi/3} + e^{-j2\pi/3}) \; B^2(1 + e^{j2\pi/3} + e^{-j2\pi/3}) \; AB(1+1+1) \; A^*B(1 + e^{-j2\pi/3} + e^{j2\pi/3})\} \\ &\quad + (1/4)e^{-j\omega_1 x_1}\{AA^*(1 + e^{-j2\pi/3} + e^{j2\pi/3}) \; B^2(1 + e^{-j2\pi/3} + e^{j2\pi/3}) \; AB(1 + e^{j2\pi/3} + e^{-j2\pi/3}) \; A^*B(1+1+1)\} \\ &= (1/2)(3AA^* + 3B^2) + (1/4)(3ABe^{j\omega_1 x_1} + 3A^*Be^{-j\omega_1 x_1}) \end{aligned} \qquad (11)$$

which is shown as plot J of FIGS. 8C and 8G, eight of the 12 terms in this summation being eliminated because their factor, $1 + e^{j2\pi/3} + e^{-j2\pi/3}$ is equal to zero, as in equation (6).

Note that the intensity in this case as well has both a DC component and a sinusoidally varying component, the sinusoidal component being observable as fringes. In this case, however, the DC component contains only the distortion terms, $AA^*$ and $B^2$, the information terms having been eliminated by the recording process; and for a similar reason the sinusoidal component contains only the information terms, $AB$ and $A^*B$. Note also that the frequency of the sinusoidal variation of the intensity is identical to the spatial frequency of the mask, $\omega_1$.

Those skilled in the art will recognize that my invention can be practiced for many other conditions of hologram formation than those assumed for the purposes of this illustrative embodiment. For example, the number of exposures can be varied and other phase shifts used. In general, the presence or absence of the information terms in the DC component of equation (11) does not affect the reconstruction from the hologram of either the information-bearing beam or its conjugate; and hence these terms can usually be ignored when ascertaining the conditions of hologram formation required in my invention. In contrast, the terms in the sinusoidal component do affect the reconstruction of either the information beam or its conjugate and accordingly must be dealt with.

Specifically, to reconstruct the information beam, the amplitude of which is $A$, on the carrier frequency $\omega_1$, it is necessary that the sum of the product of each of the terms $AA^*$, $B^2$ and $A^*B$ and its factor be small with respect to the product of the term $AB$ and its factor so that the three terms do not obscure the information beam. Similarly, to reconstruct the conjugate of the information beam, the amplitude of which is $A^*$, on the carrier frequency $-\omega_1$, the sum of the product of each of the terms $AA^*$, $B^2$ and $AB$ and its factor must be small with respect to the product of the term $A^*B$ and its factor.

Ideally, the factors of three of the terms on a carrier frequency in equation (11) are zero and one factor nonzero. Thus, for the reconstruction of the information beam, the factors of the four terms on the carrier frequency $\omega_1$ are given by:

$$\sum_{n=1}^{N} k_n t_n e j\varphi_{m_n} = 0 \qquad (6a)$$

$$\sum_{n=1}^{N} k_n t_n e j(\varphi_{m_n} + \varphi_{b_n}) = 0 \qquad (6b)$$

$$\sum_{n=1}^{N} k_n t_n e j(\varphi_{m_n} - \varphi_{b_n}) \neq 0 \qquad (6c)$$

where equation (6*a*) is the factor of the terms $AA^*$ and $B^2$, equation (6*b*) is the factor of the $A^*B$ term and equation (6*c*) is the factor of the $AB$ term and where $N$ is the number of exposures and is greater than 2;

$k_n$ is the average magnitude during each of $N$ exposures of the particular term relative to the magnitude of that term during the ($N$–1) other exposures;

$t_n$ is the duration of each of $N$ exposures relative to the duration of the ($N$–1) other exposures;

$\varphi_{m_n}$ is the phase shift in the term attributable to the position of the mask during each of $N$ exposures; and $\varphi_{b_n}$ is the phase shift in the term attributable to the phase difference between the information and reference beams during each of $N$ exposures.

For $N$=2, my invention can also be practiced; but as has been noted above, it is not possible in such a case to separate completely the information, represented by the $AB$ term; its conjugate, represented by the $A^*B$ term; and the distortion, represented by the $AA^*$ and $B^2$ terms. For example, either the conjugate or the distortion is present in the reconstructed information beam. Mathematically speaking, this means that the summation in equation (6*c* ) and the summation in either equation (6*a*) or equation (6*b*) are nonzero while the summation in the remaining term is zero.

For the reconstruction of the conjugate of the information beam, a set of equations similar to equations (6*a*, *b* and *c*) must be satisfied, the only difference being that each of the equations of the similar set is the complex conjugate of one of the three equations (6*a*, *b* and *c*). As a result, a solution to equations (6*a*, *b* and *c*) is also a solution of the reconstruction of the conjugate of the information beam.

Solutions can be readily obtained by plotting equations (6*a*, *b* and *c*) in the complex plane. The typical plot in the complex plane of a summation of $N$ terms is a series of $N$ connected lines in which the length of the *n*th line is determined by the modulus of the *n*th term, for example, $k_n t_n$ in equation (6*a*), and the angle between the *n*th line and a reference direction is determined by the argument of the *n*th exponential term, for example, $\varphi_{m_n}$ in equation (6*a*). Equation (6*a*) is solved for zero whenever the values of $k_n$, $t_n$ and $\varphi_{m_n}$ are such that the series of $N$-connected lines forms a closed figure in the complex plane. Similarly, equation (6*b*) is solved whenever the values of $k_n$, $t_n$, $\varphi_{m_n}$ and $\varphi_{b_n}$ are such that the series of $N$-connected lines representing that equation forms a closed figure in the complex plane. And equation (6*c*) is solved whenever the values of $k_n$, $t_n$, $\varphi_{m_n}$ and $\varphi_{b_n}$ are such that the series of $N$-connected lines representing that equation forms an open figure in the complex plane.

For example, where $k_n t_n$ is the same for each exposure, where the phase difference between the reference and information beams is shifted by 360°/$N$ between each exposure and where the mask is shifted between exposures a distance equal to 1/$N$ times the spatial period of the mask, which is also 360°/$N$ a plot of equation (6*a*) in a complex plane is an equilateral triangle for the case where $N$=3; a square where $N$=4; a regular pentagon where $N$=5; and, in general, a regular polygon where $N$ is greater than 2. The plot of equation (6*b*) for $N$=3 is an equilateral triangle that is the complex conjugate of the equilateral triangle that represents the solution to equation (6*a*); for $N$=4 it is a straight line that can be thought of as a closed figure; for $N$=5 it is a five-point star; and in general it is either a triangle, a line or a star for any value of $N$ greater than 2. The plot of equation (6*c*) is a straight line, but in this case the straight line represents an open figure.

For the case where $N$=3, where $k_1t_1$ is $\sqrt{3}$, $k_2t_2$ is 1 and $k_3t_3$ is 2, where $\varphi_{m_1}$ is 0°, $\varphi_{m_2}$ is 90° and $\varphi_{m_3}$ is 210°, and where $\varphi_{b_1}$ is 0°, $\varphi_{b_2}$ is 180° and $\varphi_{b_3}$ is 300°, the plot of equation (6*a*) is a 30°—°—90° triangle. For these conditions, the plot of equation (6*b*) is the complex conjugate of the above solution to equation (6*a*); and the plot of equation (6*c*) is an open figure.

Many other conditions for exposures and phase shifts during hologram formation can readily be worked out by those skilled in the art. Moreover, as has been emphasized above, it is not necessary that the factors of three of the four terms on the carrier frequency be zero, rather it is only necessary that they be small enough that when the hologram is illuminated the three terms do not obscure the term that is viewed on the carrier frequency.

When the hologram is illuminated as in FIG. 4, an undiffracted beam containing the distortion terms is observed because of the DC term, and two diffracted information-bearing beams are observed because of the sinusoidal term. As in the case of a Leith and Upatnieks hologram, a hologram having the intensity derived above has a spatial frequency bandwidth of 8$W$, 4$W$ being the width of the DC signal and 2$W$ being the width of each of the two sidebands in the sinusoidally varying signal.

In comparison, in FIG. 5 beam 539 is merely incident on a television camera tube 542 that converts the intensity of the beam into an electromagnetic information signal with a voltage proportional to the intensity. Hence, if the phase of both beams 534 and 536 is zero, then the voltage, $V_1$, of the information signal is given by:

$$V_1 \propto AA^*+B^2+AB+A^*B, \qquad (12)$$

which is shown as plot A of FIG. 8A for the case where the relative amplitude of both beams is one. Note that the plot of $V_1$ is the same as the plot of $I_1$. This signal is then transmitted and is later multiplied by modulator 544 with a bipolar sinusoidal signal having the voltage $V_{1S}$, given by:

$$V_{1S} = (1/4)(e^{i\omega_2 x_2} + e^{-i\omega_2 x_2}) \qquad (13)$$

where $\omega_2/2\pi$ is the temporal frequency of the signal and $x_2$ is time. This signal is shown as plot K of FIG. 8D for the case where $\omega_2 x_2 = \omega_1 x_1$.

Note that when $\omega_2 x_2 = \omega_{11}$ plot K is similar to plot B except for the fact that plot K has negative and positive values while plot B has only positive values. The relationship $\omega_2 x_2 = \omega_{11}$ is the basis of the similarity between physical masking and modulation techniques in my invention; for when $\omega_2 x_2 = \omega_{11}$, two properly illuminated holograms of the same object, though formed in the different fashions described in conjunction with FIGS. 3A and 5 will project the same diffracted beams at the same angles. Moreover, just as a reduction in the the spatial frequency of the stripes of mask 40 of FIG. 3A reduces the spatial frequency of the interference fringes formed on recording medium 42, so too a reduction in the temporal frequency, $\omega_2$, of the sinusoidal signal reduces the spatial frequency of the fringes formed on recording medium 546 of FIG. 5. With this relationship it is also possible to find the angular temporal frequency that is the equivalent of any given angular spatial frequency. Thus the angular temporal frequency that is the equivalent of the angular spatial frequency $W$ may be obtained simply by multiplying $W$ by an arbitrary distance and dividing the result by the time it takes camera tube 542 of FIG. 5 to scan that distance.

Multiplication of equations (12) and (13) produces a resultant signal having the voltage, $V_{1R}$, given by:

$$V_{1R} \propto (1/4)[e^{i\omega_2 x_2}(AA^*+B^2+AB+A^*B) + e^{-i\omega_2 x_2}(AA^*+B^2+AB+A^*B)] \qquad (14)$$

which is shown as plot L of FIG. 8E.

This signal is then displayed by means 545 and recorded on recording medium 546. However, because means 545 can display only a positive variation in intensity and because medium 546 can record only a positive variation, the resultant signal must be biased by a positive DC term of sufficient magnitude to ensure positive variations in intensity. As a result, the relative intensity, $I_{1_R}$, recorded on medium 546 is given by:

$$I_{1_R} \propto 2+(1/4)[e^{j\omega_2 x_2}(AA^*+B^2+AB+A^*B) + e^{-j\omega_2 x_2}(AA^*+B^2+AB+A^*B)], \quad (15)$$

which is shown as plot M of FIG. 8F.

Not that the signals recorded on media 42 and 546 are similar in form, both having a DC term and an AC term. Moreover, the frequency, $\omega_2$, of the sinusoidal signal affects the intensity recorded on medium 546 in the same way as the frequency, $\omega_1$, of the mask affects the intensity of the signal recorded on medium 42. However, the DC terms are different in that the term recorded on medium 42 contains information in the form of a function of $A$, $A^*$ and $B$ while that recorded on medium 546 does not. Thus, the plots of the intensities recorded on media 42 and 546 are ordinarily different even if the objects 33 and 533 illuminated are the same. However, in the illustrative example shown in FIG. 8, the beams incident on media 42 and 546 are assumed to contain no information; and the plots of the intensities recorded on media 42 and 546 are therefore the same.

The second and third exposures made as detailed in describing FIG. 5 produce similar effects, the appropriate phase changes in the reference beam and the sinusoidal signal modifying the resultant signal in a fashion similar to that detailed in discussing the signals produced by phase changes and mask shifts in the recording process of FIG. 3. Hence the voltages, $V_2$ and $V_3$, of the *AM* signals formed by camera tube 542 and representative of the second and third exposures are:

$$V_2 \propto AA^*+B^2+ABe^{-j2\pi/3}+A^*Be^{+j2/3} \quad (16)$$

and $$V_3 \propto AA^*+B^2+ABe^{+j2\pi/3}+A^*Be^{-j2\pi/3}. \quad (17)$$

For the example under consideration, $V_2$ and $V_3$ equal one because $1+e^{j2\pi/3}+e^{-j2\pi/3}=0$ as in equation (6); and these voltages, $V_2$ and $V_3$, are shown as plot D of FIG. 8A. Note that the plots of $V_2$ and $V_3$ are the same as the plots of $I_2$ and $I_3$.

Similarly, the voltages, $V_{2_S}$ and $V^3{}_S$, of the bipolar sinusoidal signals during the second and third exposures are:

$$V_{2_S}=(1/4)[e^{j\omega_2 x_2}e^{j2\pi/3}+e^{-j\omega_2 x_2}e^{-j2\pi/3}] \quad (18)$$

and $$V_{3_S}=(1/4)[e^{j\omega_2 x_2}e^{-j2\pi/3}+e^{-j\omega_2 x_2}e^{j2\pi/3}] \quad (19)$$

These signals are shown as plots N and O, respectively, in FIG. 8D. Note that they are similar to plots E and F of FIG. 8B except for the fact that they have negative and positive values.

After multiplication of the signals by modulator 544 and suitable biasing, the resultant signals are displayed by means 545 and recorded on medium 546. The relative intensity, $I_{2_R}$, recorded on medium 546 by the second exposure is given by the sum of the product of equations (16) and (18) and a biasing component:

$$I_{2_R} \propto 2+(1/4)[e^{j\omega_2 x_2}(AA^*e^{j2\pi/3}+B^2e^{j2\pi/3}+AB+A^*Be^{-j2\pi/3})+e^{-j\omega_2 x_2}(AA^*e^{-j2\pi/3}+B^2e^{-j2\pi/3}+ABe^{j2\pi/3}+A^*B)] \quad (20)$$

which is shown as plot P in FIG. 8F, and the relative intensity, $I_{3_R}$, recorded by the third exposure is given by the product of equations (17) and (19):

$$I_{3_R} \propto 2+(1/4)[e^{j\omega_2 x_2})(AA^*e^{-j2\pi/3}+B^2e^{-j2\pi/3}+AB+A^*Be^{j2\pi/3})+e^{-j\omega_2 x_2}(AA^*e^{j2\pi/3}+B^2e^{j2\pi/3}+ABe^{-j2\pi/3}+A^*B)] \quad (21)$$

which is shown as plot Q in FIG. 8F. Although for the assumptions of the illustrative example the biasing term need only be (½) in relations (20) and (21), for the case where $A$ is a complex number the biasing term must be 2. Because the latter case is the one ordinarily encountered, the biasing term has been assumed to be 2 in these equations.

Because these three signals are all recorded on the same area of medium 546 they are effectively summed to yield a total intensity, $I_{T_R}$, given by:

$$I_{T_R} \propto I_{1_R}+I_{2_R}+I_{3_R}$$

$$\propto 2+2+2+(1/4)e^{j\omega 2x2}[AA^*(1+e^{j2\pi/3}+e^{-j2\pi/3})B^2(1+e^{j2\pi/3}+e^{-j2\pi/3})AB(1+1+1)A^*B(1+e^{-j2\pi/3}+e^{j2\pi/3})]+(1/4)e^{-j\omega 2x2}[AA^*(1+e^{-j2\pi/3}+e^{j2\pi/3}) \quad (22)$$

$$B^2(1+e^{-j2\pi/3}+e^{j2\pi/3})AB(1+e^{j2\pi/3}+e^{j2\pi/3})A^*B(1+1+1)] \propto 6+(1/4)[3ABe^{j2\omega 2x}+3A^*Be^{-j\omega 2x2}]$$

which is shown as plot R of FIGS. 8F and 8G, six of the terms in this summation being eliminated because their factor, $1+e^{j2\pi/3}+e^{-j2\pi/3}$, is equal to zero, as in equation (6). Of course, the more general expression of the factors of the six terms of relation (22) that are eliminated are those given in equations (6*a*, *b* and *c*) above. It is only necessary to substitute in equations (6*b* and *c*) for the term, $\varphi_{m_n}$, which is the phase shift attributable to the position of the mask of FIG. 3A, a term that represents the phase of the bipolar sinusoidal signal.

Comparison of the total intensity recorded on medium 546, relationship (22), with that recorded on medium 42 of FIg. 3, equation (11), reveals that the intensities are similar in form but have different DC components. Because there are no distortion terms and no information terms in the DC component of the total intensity recorded on medium 546, when this record is illuminated in FIG. 7 the undiffracted beam 724 that is observed is readily filtered out. The absence of distortion and information in the DC term and hence in undiffracted beam 724 means that the light in beam 724 is parallel which is to say that beam 724 has a spatial frequency bandwidth of zero. Such a parallel beam can easily be filtered out by a converging lens and an appropriately located opaque object. In contrast, the presence of information in any beam means that not all the light therein is parallel, that is, the beam occupies a certain spatial frequency bandwidth.

Because undiffracted beam 724 has zero bandwidth, there is no need to separate the diffracted beams from the undiffracted beam, and consequently the angle between the two diffracted beams can be less than it is when there is between them an undiffracted beam of a finite bandwidth. As a result, the minimum spatial frequency bandwidth needed to store the hologram on medium 546 is lower than that required in an ordinary Leith and Upatnieks hologram and the minimum resolution required of display means 545 and of recording medium 546 is consequently lower. As has been explained above, fringes of a lower spatial frequency and hence of a lower spatial frequency bandwidth are formed simply by using a lower frequency, $\omega_2$, of the carrier wave that the sinusoidal signal generator 553 provides. Because the bandwidth of the undiffracted beam of a Leith and Upatnieks hologram is $4W$, the maximum reduction in bandwidth achievable by eliminating this undiffracted beam is 50 percent, from a bandwidth of $8W$ to one of $4W$; and the embodiment shown in FIG. 5 does achieve this reduction by using a sinusoidal signal frequency, $\omega_2$, that is the equivalent of $\pm W$ instead of $\pm 3W$.

In comparison with the requirements of the Leith and Upatnieks hologram, reductions can also be made in the spatial resolution required of camera tube 542 and the time-bandwidth product required of transmission system 543. As was mentioned above, $W$ is the maximum spatial frequency in the information-bearing beam; and the range of frequencies therein is from $-W$ to $+W$. Because the plane wavefront reference beam is collinear with this information beam, the range of spatial frequencies in the collinear beam is also from $-W$ to $+W$ and the spatial frequencies of the fringes formed by the interference of the information beam with the reference beam on camera tube 542 therefore range from $-W$ to $+W$. At the same time, interference of the information beam with itself produces fringes having spatial frequencies ranging from $-2W$ to $+2W$. These fringes, however, create only a distortion, and there is therefore no need to scan the fringes with frequencies from $+W$ to $+2W$ or from $-W$ to $-2W$. Moreover, because knowledge of only the positive spatial frequencies of the fringes formed on the target of camera tube 542 by interference of the information and reference beams is sufficient to reconstruct these fringes, camera tube 542 need only be able to resolve the spatial frequencies from 0 to $+W$. In contrast, the camera tube that is capable of transmitting a Leith and Upatnieks hologram must be able to resolve spatial frequencies as high as $4W$ because the useful information in such a hologram is contained in fringes having spatial frequencies ranging from $+2W$ to $+4W$ and from $-2W$ to $-4W$. Consequently, the spatial resolution required of the camera tube is reduced in my invention by a factor of 4. Because camera tubes have a limited resolution, this is an important advantage.

As explained above, camera tube 542 forms an electromagnetic information signal representative of the information contained in the interference fringes formed on it. The temporal frequency bandwidth of this signal can be as small as the temporal frequency equivalent of the spatial frequency $W$. This signal is transmitted to the point where the hologram is to be viewed where it is multiplied by a bipolar sinusoidal signal. Because the spatial frequencies of the interference fringes stored on medium 546 of FIG. 5 range from $-2W$ to $+2W$ as explained above, the frequency, $\omega_2$, of the carrier wave sinusoidal signal need be only $\pm W$.

The bandwidth of $W$ required for transmission of the signal representative of the intensity pattern formed on camera tube 542 is one-fourth that of the $4W$ bandwidth needed to transmit a comparable Leith and Upatnieks hologram. However, to form the set of interference fringes on recording medium 546 that will reconstruct an image of object 33 it is necessary to transmit three signals representative of three intensity patterns of camera tube 542. Hence, though the bandwidth of one signal be $W$, the transmission time required is three times that required to transmit a signal representative of a comparable Leith and Upatnieks hologram: and the time-bandwidth product of the embodiment of FIG. 5 is three-fourths that of the comparable Leith and Upatnieks hologram.

THIRD EMBODIMENT OF THE INVENTION

FIG. 9 shows an alternative embodiment that reduces the transmission time as well as the transmission bandwidth by processing the information signal output from the camera tube, shown as element 942 of FIG. 9, in a different fashion. The components used to form a set of interference fringes on camera tube 942 are the same as those shown in FIG. 5 as forming a set of fringes on camera tube 542, with corresponding components having the same last two numbers but a different number in the 100's column. The remaining components are an amplitude modulator 944 for modifying the *AM* signal output of camera tube 942; a tapped delay line 960, a signal-combining means 961 and a gate 962 for combining into one the three information signals produced in three successive exposures; a transmission system 943 for transmitting the combined signal; a display means 945 for converting the signal back to a spatial pattern; and a recording medium 946 for recording the pattern.

In addition, an AC signal generator 953 and a phase shifter 954 form the signal used by modulator 944 to modify the information signal outputs of camera tube 942; and a DC voltage source 955, a switch 956, resistors 957, 957' and 957'', a pulse-forming means 958 and a triggering means 959 provide synchronization to certain of the components. Phase shifter 954 is similar to that shown in FIGS. 5 and 6, and the synchronization means are similar to those shown in FIG. 5.

In processing the information signal output of camera tube 942 that is representative of the first set of interference fringes formed on the tube, the information signal is fed into modulator 944 where is is multiplied with a first bipolar sinusoidal signal. The resultant signal is then fed to a tapped delay line 960 where it is delayed for the length of time it takes camera tube 942 to form two more information signals representative of the fringes formed on tube 942 in the next two succeeding frames. This delay is effected because gate 962 remains open, i.e., nonconducting, during the formation of the first two signals that are formed.

After the information signal representative of the first set of interference fringes is formed, the phase relation between beams 932 and 936, and therefore between beams 934 and 936, is shifted by 120° as was done with the embodiment shown in FIG. 5. Camera tube 942 is again exposed, and a signal is formed representative of the interference fringes that are formed. This signal is then multiplied in modulator 944 by a second bipolar sinusoidal signal similar to the first in every way but that its phase has been shifted 120°. The resultant signal is then feed to tapped delay line 960 where it is delayed for the length of time it takes tube 942 to form another information signal. Similar steps are followed to form a third set of interference fringes with a phase shift of 240° and to multiply the signal representative of this set with a signal having a phase of 240°. This signal is not delayed.

Thus, if the scanning time of camera tube 942 is one-thirtieth of a second, the information signal representative of the first set of interference fringes is formed in one-thirtieth of a second; and the resultant signal produced by multiplying the information signal with the first bipolar sinusoidal signal is delayed by delay line 960 for two-thirtieths of a second. The information signals representative of the second and third sets of interference fringes are similarly formed in one-thirtieth of a second each. However, the signal produced by multiplying the second information signal with the second sinusoidal signal is delayed only one-thirtieth of a second; and the signal produced by multiplying the third information signal with the third sinusoidal signal is not delayed at all.

As camera tube 942 begins to produce the third signal, gate 962 closes; and as a result the two signals that have been delayed by delay line 960 and the third signal then being formed are directed to to a signal-combining means 961 that combines the three signals exactly. The combined signal then goes through gate 962 to a transmission system 943 that sends the signal to the point where the information stored in the signal is to be viewed. There the signal is displayed by display means 945 and recorded on recording medium 946. As in FIG. 5, typical display means and recording medium are a cathode ray tube and a photographic film. Alternatively, an electron gun and a thermoplastic medium may be used.

With two exceptions the circuit used for synchronization is similar to that shown in FIG. 5. First, the pulse signals produced by pulse-forming means 958 also operate gate 962 so that it is closed only during the duration of every third pulse. Typically, this can be accomplished by using a count-3 circuit such as that shown in FIG. 6, to produce at every third pulse a voltage that closes gate 962. Second, in contrast to the requirements in FIg. 5, synchronization between generator 953 and display means 945 is not as critical because the three different-phase signals are combined into one at means 961 and no further steps are required to keep them properly synchronized with each other. Of course, in a manner analogous to that described in conjunction with FIG. 5, care must be taken to ensure that the three signals are synchronized with each other when they are combined by means 961.

The record on medium 946 of the intensity patterns displayed by means 945 is a hologram. This hologram is very similar to the hologram formed in FIG. 5 for it can be shown that the voltages of the three resultant signals produced by modulator 944 are the same as the voltages of the three resultant signals produced by modulator 544. Specifically, the first resultant signal formed by modulator 944 has a voltage equal to that described by relationship (14) above, which is the product of equations (12) and (13); and the second and third signals from modulator 944 have voltages equal, respectively, to those described by the products of equations (16) and (18) and equations (17) and (19). Relationship (14) is shown as plot L of FIG. 8E; and the products of equations (16) and (18) and equations (17) and (19) are shown as plots S and T, respectively, of FIG. 8E.

There is, however, a small difference between the holograms formed in FIGS. 9 and 5 because the signals that are combined in FIG. 9 are positive and negative voltages while those combined in FIG. 5 are positive intensities. Thus the combined voltage, $V_T$, fed from signal-combining means 961 of FIG. 9 is $$V_T \propto (1/4)(3ABe^{j\omega_2 x_2} + 3A^*Be^{-j\omega_2 x_2}) \quad (26)$$

which is shown as plot U of FIG. 8E with the assumptions that $A$ and $B$ are both real and equal to one.

This signal is then biased to ensure only positive variations in intensity and is recorded on medium 946. The total relative intensity recorded, $I_{T_R}$, is given by $$I_{T_R} \propto [(3/2) + (1/4)(3ABe^{j\omega_2 x_2} + 3A^*Be^{-j\omega_2 x_2})] \quad (27)$$

which is shown as plot V of FIG. 8G. Note that plot V is similar to plots J and R, which are also shown in FIG. 8G with the exception that the DC term is not as great.

Because there are no distortion terms and no information terms in the DC component of the total intensity recorded on medium 946, the hologram of FIG. 9 can be viewed with the apparatus of FIG. 7 in exactly the same way the hologram of FIG. 5 was. Thus a beam of coherent light incident on the hologram formed in FIG. 9 produces one undiffracted beam and two diffracted beams. And just as has been explained in discussing FIG. 7, the undiffracted beam contains no information and is therefore easily filtered out with a converging lens and a suitably located stop; and the diffracted beams form virtual and real images of the object stored in the hologram formed in FIG. 9.

As in the case of the holgram formed with the apparatus of FIG. 5, filtering out the undiffracted beam permits the formation of a hologram on medium 946 that has as little as one-half the spatial frequency bandwidth of the ordinary Leith and Upatnieks hologram. Furthermore, the spatial resolution required on camera tube 942 is reduced by a factor of four as discussed for the embodiment shown in FIG. 5.

Moreover, the hologram processing and transmission system of FIG. 9 also reduces the time required for transmission of the signal representative of the information contained in the intensity pattern formed on camera tube 942. As noted above in discussing the signal formed by camera tube 542, even though the spatial frequencies of the fringes formed on camera tube 942 range from $-2W$ to $+2W$, the temporal frequency bandwidth of the signal formed by camera tube 942 and representative of the information contained in these fringes need only be the equivalent of $W$. The signal formed by camera tube 942 is then multiplied in modulator 944 by a bipolar sinusoidal signal. This multiplication has the effect of putting the signal on a carrier frequency of $\pm W$, thereby increasing the bandwidth of the signal to the equivalent of $2W$. As detailed above, three such signals representative of three exposures are then combined by means 961 and transmitted. However, because combining the signals produces a signal having the bandwidth and transmission time of only one of the three signals, the bandwidth of the combined signal is still the equivalent of $2W$ and its transmission time is merely the length of time it would take to transmit one of the information signals transmitted by the apparatus of FIG. 5. In contrast, a bandwidth of $4W$ is needed to transmit a comparable Leith and Upatnieks hologram in the same amount of time. Hence, the time-bandwidth product of this embodiment of the invention is one-half that of a comparable Leith and Upatnieks hologram.

CONCLUSION

As has been mentioned at several points in my description of my invention, the several embodiments disclosed herein admit of many modifications in practice. It will be appreciated that those skilled in the art may devise other arrangements that fall within the spirit and scope of the invention.

I claim:

1. A holographic method for storing information representative of an object comprising the steps of:
   illuminating the object with a first light beam to produce an information-bearing beam;
   providing a reference light beam having a first constant phase relation with the information-bearing beam;
   aligning the reference light beam in a direction collinear with the information-bearing beam to produce an interference pattern;
   forming a representation of at least portions of the interference pattern so produced;
   forming a second interference pattern in the same manner with the information-bearing beam and the reference beam having a second constant phase relation;
   forming a representation of at least portions of the second interference pattern;
   forming a third interference pattern in the same manner with the information-bearing beam and the reference beam having a third constant phase relation; and
   forming representation of at least portions of the third interference pattern, where the average magnitude of the information-bearing beam and the reference beam, the duration of the representation-forming steps and the phase relation between the information-bearing beam and the reference beam during the formation of each representation are such that, when the representations are combined and illuminated by a reconstructing light beam, these factors together with the combining process enable at least one of a virtual image and a real image of the object to be observed without interference from the other or from the reconstructing light beam.

2. A record containing information representative of an object made by:
   illuminating the object with a first light beam to produce an information-bearing beam;
   providing a reference light beam having a first constant phase relation with the information-bearing beam;
   aligning the reference light beam in a direction collinear with the information-bearing beam to produce an interference pattern;
   forming a representation of at least portions of the interference pattern so produced;
   forming a second interference pattern in the same manner with the information-bearing beam and the reference beam having a second constant phase relation;
   forming a representation of at least portions of the second interference pattern;
   forming a third interference pattern in the same manner with the information-bearing beam and the reference beam having a third constant phase relation;
   forming a representation of at least portions of the third interference pattern; and
   combining the representations of the interference patterns into one by combining at least portions of the representations with each other.

3. A method for storing in a hologram information representative of an object and reconstructing the object therefrom comprising the steps of:
   successively modulating a plurality, $N$, of coherent light beams with the object about which information is to be stored, thereby forming $N$ information-bearing beams where $N$ is an integer equal to or greater than three;
   combining into a collinear beam each information-bearing beam and a reference light beam having a constant phase relation to the information beam, thereby forming $N$ collinear beams;

directing each colinear beam through a portion of a mask onto a recording medium, thereby making $N$ exposures, the mask comprised of a medium with periodically varying transmissivity;

shifting between at least two pairs of exposures the phase relation between the information beam and the reference beam so that said phase relation is different for each of at least three exposures;

shifting the mask between at least two pairs of exposures a distance equivalent to a portion of the fundamental period of the transmissivity variation where the sum of the distances shifted between two pairs of exposures is not equal to an integral multiple of the period of the transmissivity variation; and illuminating the recording medium with a suitable beam, thereby reconstructing a diffracted information-bearing, image-forming beam emanating from the recording medium at an angle to any undiffracted portion of the illuminating beam that transits the recording medium.

4. A method for storing in a hologram information representative of an object comprising the steps of:

successively modulating a plurality, $N$, of coherent light beams with the object about which information is to be stored, thereby forming $N$ information-bearing beams where $N$ is an integer equal to or greater than three;

combining into a collinear beam each information-bearing beam and a reference light beam having a constant phase relation to the information beam, thereby forming $N$ collinear beams;

directing each collinear beam through a portion of a mask onto a recording medium, thereby making $N$ exposures, the mask comprised of a medium with periodically-varying transmissivity;

shifting between at least two pairs of exposures the phase relation between the information beam and the reference beam so that said phase relation is different for each of at least three exposures; and shifting the mask between at least two pairs of exposures a distance equivalent to a portion of the fundamental period of the transmissivity variation where the sum of the distances shifted between two pairs of exposures is not equal to an integral multiple of the period of the transmissivity variation.

5. The method of claim 4 wherein:

the phase relation between the information beam and the reference beam is shifted between each exposure by an amount equal to a multiple of 360° divided by $N$; and the mask is shifted between each exposure a distance equivalent to a multiple of the fundamental period of the transmissivity variation divided by $N$.

6. The method of claim 4 wherein the average magnitude and duration of each exposure, the phase shifting between the information-bearing beam and the reference beam between exposures, and the shifting of the mask between exposures form a hologram in which the intensity is represented by:

$$I=C_1(AA^*+B^2)+C_2AB+C_3A^*B$$

where $$C_1=\sum_{n-1}^{N} k_n t_n e j \varphi_{m_n}$$

$$C_2=\sum_{n-1}^{N} k_n t_n e j (\varphi_{m_n}-\varphi_{b_n})$$

$$C_3=\sum_{n-1}^{N} k_n t_n e j (\varphi_{m_n}+\varphi_{b_n})$$

where $N$ is the number of exposures and is greater than or equal to three;

$k_n$ is the average magnitude during each of $N$ exposures of the particular term relative to the magnitude of that term during the ($N$–1) other exposures;

$t_n$ is the duration of each of $N$ exposures relative to the duration of the ($N$–1) other exposures;

$\varphi_{m_n}$ is the phase shift in the term attributable to the step of shifting the mask between exposures;

$\varphi_{b_n}$ is the phase shift in the term attributable to the phase difference between the information-bearing and reference beams during each of $N$ exposures; and either $C_2$ is substantially greater than both $C_1$ and $C_3$ or $C_3$ is substantially greater than both $C_1$ and $C_2$.

7. A method for storing information representative of an object comprising the steps of:

modulating a plurality, $N$, of coherent light beams with the object about which information is to be stored, thereby forming $N$ information-bearing beams where $N$ is an integer equal to or greater than three;

combining into a collinear beam each information-bearing beam and a reference beam having a constant phase relation to the information beam, thereby forming $N$ collinear beams;

directing each collinear beam onto a recording medium, thereby making $N$ exposures;

shifting between at least two pairs of exposures the phase relation between the information beam and the reference beam so that said phase relation is different for each of at least three exposures;

converting each exposure into an electromagnetic signal, thereby forming $N$ such signals;

modulating each electromagnetic signal with a periodic signal having a phase that is different during the modulation of each of at least three signals.

8. The method of claim 7 wherein:

the phase relation between the information beam and the reference beam is shifted between each exposure by an amount equal to a multiple of 360° divided by $N$; and the phase of the periodic signal differs between each modulation by an amount equal to a multiple of 360° divided by $N$.

9. The method of claim 7 wherein the average magnitude and duration of each exposure, the phase shifting between the information-bearing beam and the reference beam between exposures and the different phases of the periodic signal form a hologram in which the intensity is represented by:

$$I=C_1(AA^*+B^2)+C_2AB+C_3A^*B$$

where $$C_1=\sum_{n-1}^{N} k_n t_n e j \varphi_{m_n}$$

$$C_2=\sum_{n-1}^{N} k_n t_n e j (\varphi_{m_n}-\varphi_{b_n})$$

$$C_3=\sum_{n-1}^{N} k_n t_n e j (\varphi_{m_n}+\varphi_{b_n})$$

where $N$ is the number of exposures and is greater than of equal to three;

$k_n$ is the average magnitude during each of $N$ exposures of the particular term relative to the magnitude of that term during the ($N$–1) other exposures;

$t_n$ is the duration of each of $N$ exposures relative to the duration of the ($N$–1) other exposures;

$\varphi_{m_n}$ is the phase shaft in the term attributable to the phase difference between the information-bearing and reference beams during each of $N$ exposures;

$\varphi_{b_n}$ is the phase shift in the term attributable to the phase difference between the information-bearing and reference beams during each of $N$ exposures; and either $C_2$ is substantially greater than both $C_1$ and $C_3$ or $C_3$ is substantially greater than both $C_1$ and $C_2$.

10. The method of claim 7 further comprising the step of converting each of the $N$ modulated electromagnetic signals into a spatial pattern and combining the spatial pattern into one that is recorded on a suitable recording medium.

11. The method of claim 7 further comprising the steps of:

combining the $N$ modulated electromagnetic signals by adding them together to form on modulated electromagnetic signal; and converting said one modulated electromagnetic signal into a spatial pattern that is recorded on a suitable recording medium.

12. A holographic method for storing information representative of an object comprising the steps of:

illuminating the object with a first light beam to produce an information-bearing beam;

providing a reference light beam having a first constant phase relation with the information-bearing beam;

aligning the reference light beam in a direction colinear with the information-bearing beam to produce an interference pattern;

forming a representation of at least portions of the interference pattern so produced;

forming a second interference pattern in the same manner with the information-bearing beam and the reference beam having a second constant phase relation;

forming a representation of at least portions of the second interference pattern;

forming a third interference pattern in the same manner with the information-bearing beam and the reference beam having a third constant phase relation;

forming a representation of at least portions of the third interference pattern; and combining the representations of the interference patterns into one by combining at least portions of the representations with each other.

13. The method of claim 12 wherein:

$N$ representations of interference patterns are formed where $N$ is a number greater than or equal to three; and the steps of forming representations of at least portions of the interference patterns and combining these representations comprise the steps of:

directing each collinear reference beam and information-bearing beam onto a recording medium, thereby making $N$ exposures; and combining the $N$ exposures into one by interlaying in order portions of each exposure among portions of the other exposures.

14. The method of claim 12 wherein the average magnitude of the interfering light beams and duration of each representation-forming step, the phase difference between the information-bearing beam and the reference beam during each representation-forming step, and the combining of the representations of the interference patterns form a hologram in which the intensity is represented by:

$$I=C_1(AA^*+B^2)+C_2AB+C_3A^*B$$

where $$C_1=\sum_{n-1}^{N} k_n t_n e j \varphi_{m_n}$$

$$C_2=\sum_{n-1}^{N} k_n t_n e j (\varphi_{m_n}-\varphi_{b_n})$$

$$C_3=\sum_{n-1}^{N} k_n t_n e j (\varphi_{m_n}+\varphi_{b_n})$$

where $N$ is the number of representation-forming steps and is greater than or equal to three;

$k_n$ is the average during each of $N$ representation-forming steps of the particular term relative to the magnitude of that term during the $(N-1)$ other representation-forming steps; $t_n$ is the duration of each of $N$ representation-forming steps relative to the duration of the $(N-1)$ other representation-forming steps;

$\varphi_{m_n}$ is the phase shift in the term attributable to the step of combining the $N$ representations;

$\varphi_{b_n}$ is the phase shift in the term attributable to the phase difference between the information-bearing and reference beams during each of $N$ representation-forming steps; and either $C_2$ is substantially greater than both $C_1$ and $C_3$ or $C_3$ is substantially greater than both $C_1$ and $C_2$.

15. The method of claim 12 wherein:

$N$ representations of interference patterns are formed where $N$ is a number greater than or equal to three; and the steps of forming representations of at least portions of the interference patterns and combining these representations comprise the steps of:

directing each collinear reference beam and information-bearing beam through a portion of a mask onto a recording medium, thereby making $N$ exposures, the mask being comprised of a medium having a periodically varying transmissivity; and shifting the mask between at least two pairs of exposures by a distance equivalent to a portion of the fundamental period of its transmissivity variation where the sum of the distances shifted between two pairs of exposures is not equal to an integral multiple of the period of transmissivity variation.

16. The method of claim 15 wherein:

the phase relation between the first light beam and the reference beam that produce the interference pattern of one representation differs from the phase relation between the fist light beam and the reference beam that produce the interference pattern of another representation by an amount equal to an integral multiple of 360° divided by $N$; and the distance the mask is shifted between at least one pair of exposures is an integral multiple of the fundamental period of the transmissivity variation of the mask divided by $N$.

17. The method of claim 15 wherein the shifting of the mask between exposures and the changes that are made between exposures in the phase relation between the first light beam and the reference beam are such that when a suitable record of the combined representations of the interference patterns is illuminated by a reconstructing light beam an image of the object is observed at an angle from the reconstructing beam.

18. The method of claim 15 wherein:

the phase relation between the first light beam and the reference beam that produce the interference pattern of each representation differs from the phase relation between the two beams that produce the interference pattern of every other representation by an amount equal to some integral multiple of 360° divided by $N$; and the distance the mask is shifted between each pair of exposures is an integral multiple of the fundamental period of the transmissivity variation of the mask divided by $N$.

19. The method of claim 18 wherein $N$ is equal to three.

20. The method of claim 12 wherein:

$N$ representations of interference patterns are formed where $N$ is a number greater than or equal to three; and the steps of forming representations of at least portions of the interference patterns and combining these representations comprise the steps of:

directing each collinear reference beam and information-bearing beam onto a recording medium, thereby making $N$ exposures;

converting each exposure into an electromagnetic signal, thereby forming $N$ such signals; and modulating each electromagnetic signal with a periodic signal having a phase that is different during the modulation of each of at least three signals.

21. The method of claim 20 wherein the steps of forming representations of at least portions of the interference patterns and combining these representations comprise the additional step of combining the $N$ modulated electromagnetic signals into one signal.

22. The method of claim 20 wherein the steps of forming representations of at least portions of the interference patterns and combining these representations comprises the additional step of converting and combining the $N$ modulated electromagnetic signals into one spatial pattern that is recorded on a suitable recording medium.

23. The method of claim 20 wherein the steps of forming representations of at least portions of the interference patterns and combining these representations comprises the additional steps of:

combining the $N$ modulated electromagnetic signals into one such signal; and converting that one modulated electromagnetic signal into a spatial pattern that is recorded on a suitable recording medium.

24. The method of claim 20 wherein differences in the phases of the periodic signal from one modulation to another and the changes that are made between exposures in the phase relation between the first light beam and the reference beam are such that when a suitable record of the combined representations of the interference patterns is illuminated by a reconstructing light beam an image of the object is observed at an angle from the reconstructing beam.

25. The method of claim 20 wherein:

the phase relation between the first light beam and the reference beam that produce the interference pattern of one representation differs from the phase relation between the first light beam and the reference beam that produce the interference pattern of another representation by an amount equal to an integral multiple of 360° divided by $N$; and the phase of the periodic signal during at least one modulation differs from the phase during another by an amount equal to an integral multiple of 360° divided by $N$.

26. The method of claim 25 wherein:

the phase relation between the first light beam and the reference beam that produce the interference pattern of each representation differs from the phase relation between the two beams that produce the interference pattern of every other representation by an amount equal to some integral multiple of 360° divided by $N$; and the phase of the periodic signal during each modulation differs from the phase during every other modulation by an amount equal to an integral multiple of 360° divided by $N$.

27. The method of claim 26 wherein $N$ is three.